United States Patent
Lepp et al.

(10) Patent No.: US 8,950,681 B2
(45) Date of Patent: Feb. 10, 2015

(54) UNIVERSAL INTEGRATED CIRCUIT CARD APPARATUS AND RELATED METHODS

(75) Inventors: James Randolph Winter Lepp, Ottawa (CA); Jean-Philippe Paul Cormier, Ottawa (CA); Johanna Lisa Dwyer, Kanata (CA)

(73) Assignee: Blackberry Limited, Waterloo, Ontario ( * ) Notice: Subject to any disclaimer, the term of this patent is extended or adjusted under 35 U.S.C. 154(b) by 424 days.

(21) Appl. No.: 13/296,946

(22) Filed: Nov. 15, 2011

(65) Prior Publication Data

US 2013/0116010 A1 May 9, 2013

Related U.S. Application Data

(63) Continuation-in-part of application No. 29/405,845, filed on Nov. 7, 2011, now Pat. No. Des. 691,610.

(51) Int. Cl.
- *G06K 19/06* (2006.01)
- *H05K 1/14* (2006.01)
- *H01R 25/00* (2006.01)
- *G06K 19/07* (2006.01)
- *G06K 19/077* (2006.01)

(52) U.S. Cl.
CPC ............ *G06K 19/072* (2013.01); *G06K 19/077* (2013.01)
USPC ............ 235/492; 361/737; 361/784; 439/638

(58) Field of Classification Search
CPC . G06K 19/072; G06K 19/077; G06K 7/0021; G06K 19/07739

USPC ................... 235/492; 455/558; 361/737, 784; 439/638

See application file for complete search history.

(56) References Cited

U.S. PATENT DOCUMENTS

| | | | |
|---|---|---|---|
| 4,639,585 A | 1/1987 | Haghiri-Tehrani et al. | |
| 4,764,803 A | 8/1988 | Ueda | |
| 4,990,759 A | 2/1991 | Gloton et al. | |
| 5,031,026 A | 7/1991 | Ueda | |
| 5,049,728 A | 9/1991 | Rovin | |

(Continued)

FOREIGN PATENT DOCUMENTS

| | | |
|---|---|---|
| CA | 145573 | 8/2013 |
| CN | ZL 201230153602.2 | 10/2013 |

(Continued)

OTHER PUBLICATIONS

Nokia, "Nokia 4FF Proposal and Rationale," based on the discussion and feedback from leading suppliers and manufacturers of SIM card connectors, Aug. 25, 2011, 5 pages.

(Continued)

*Primary Examiner* — Michael G Lee
*Assistant Examiner* — Laura Gudorf
(74) *Attorney, Agent, or Firm* — Hanley, Flight & Zimmerman, LLC

(57) ABSTRACT

UICC apparatus and related methods are disclosed herein. An example UICC apparatus includes a carrier and a first UICC defined by a first punch-out feature formed in the carrier. The first punch-out feature is configured to remain attached to the carrier when the first UICC is removed from the carrier.

20 Claims, 10 Drawing Sheets

(56) References Cited

U.S. PATENT DOCUMENTS

| | | |
|---|---|---|
| 5,055,662 A | 10/1991 | Hasegawa |
| 5,208,450 A | 5/1993 | Uenishi et al. |
| 5,272,374 A | 12/1993 | Kodai et al. |
| D344,502 S | 2/1994 | Gloton |
| 5,289,349 A | 2/1994 | Nishino |
| 5,362,955 A | 11/1994 | Haghiri-Tehrani |
| D353,135 S | 12/1994 | Gloton |
| 5,410,136 A | 4/1995 | McIntire et al. |
| D358,142 S | 5/1995 | Gloton |
| D365,092 S | 12/1995 | Mundigl et al. |
| 5,514,862 A | 5/1996 | Salzano |
| 5,531,145 A | 7/1996 | Haghiri-Tehrani |
| D374,870 S | 10/1996 | Gaumet |
| D375,303 S | 11/1996 | Gaumet |
| 5,581,065 A | 12/1996 | Nishikawa et al. |
| 5,581,445 A | 12/1996 | Horejs, Jr. et al. |
| 5,639,385 A | 6/1997 | McCormick |
| 5,671,525 A | 9/1997 | Fidalgo |
| 5,677,524 A | 10/1997 | Haghiri-Tehrani |
| D387,746 S | 12/1997 | Ishihara |
| D393,458 S | 4/1998 | Merlin et al. |
| 5,757,116 A | 5/1998 | Nishikawa et al. |
| 5,780,837 A | 7/1998 | Garcia |
| 5,850,690 A | 12/1998 | Launay et al. |
| 5,852,289 A | 12/1998 | Masahiko |
| D405,779 S | 2/1999 | Huber et al. |
| D406,822 S | 3/1999 | Huber et al. |
| D412,164 S | 7/1999 | Laviron et al. |
| 5,936,227 A | 8/1999 | Truggelmann et al. |
| D416,246 S | 11/1999 | Hileman |
| 5,975,420 A | 11/1999 | Gogami et al. |
| 5,975,584 A | 11/1999 | Vogt |
| D424,043 S | 5/2000 | Shiroki |
| D424,539 S | 5/2000 | Shiroki |
| 6,065,681 A | 5/2000 | Truggelmann |
| 6,076,737 A | 6/2000 | Gogami et al. |
| D427,577 S | 7/2000 | Haas et al. |
| 6,112,997 A | 9/2000 | Jelinek et al. |
| 6,151,511 A | 11/2000 | Cruciani |
| 6,179,210 B1 | 1/2001 | Haas et al. |
| 6,193,163 B1 | 2/2001 | Fehrman et al. |
| 6,320,751 B2 | 11/2001 | Takeda et al. |
| 6,353,420 B1 | 3/2002 | Chung |
| 6,370,029 B1 | 4/2002 | Kawan |
| 6,386,459 B1 | 5/2002 | Patrice et al. |
| 6,398,114 B1 | 6/2002 | Nishikawa et al. |
| 6,448,638 B1 | 9/2002 | Fidalgo et al. |
| 6,454,164 B1 | 9/2002 | Wakabayashi et al. |
| 6,471,129 B2 | 10/2002 | Lake |
| 6,561,432 B1 | 5/2003 | Vedder et al. |
| 6,568,600 B1 | 5/2003 | Carpier et al. |
| 6,634,565 B2 | 10/2003 | Gray |
| 6,653,565 B2 | 11/2003 | Kashima |
| 6,666,379 B2 | 12/2003 | Lake |
| 6,685,097 B1 | 2/2004 | Housse |
| 6,693,544 B1 | 2/2004 | Hebbecker |
| 6,719,206 B1 | 4/2004 | Bashan et al. |
| 6,722,571 B1 | 4/2004 | Lavrut et al. |
| 6,776,347 B2 | 8/2004 | Nishikawa et al. |
| 6,786,419 B2 | 9/2004 | Kayanakis |
| 6,817,534 B2 | 11/2004 | Gray |
| 6,964,377 B1 | 11/2005 | Haghiri et al. |
| D512,970 S | 12/2005 | Hart |
| 6,978,940 B2 | 12/2005 | Luu |
| 6,991,172 B2 | 1/2006 | Luu |
| 7,086,601 B2 | 8/2006 | Dhers et al. |
| D532,757 S | 11/2006 | Lai |
| D533,847 S | 12/2006 | Lai |
| D534,134 S | 12/2006 | Lai |
| 7,183,636 B1 | 2/2007 | Boccia et al. |
| 7,264,172 B2 | 9/2007 | Amiot et al. |
| D562,817 S | 2/2008 | Fiorentino |
| 7,341,198 B2 | 3/2008 | Nishizawa et al. |
| D567,244 S | 4/2008 | Frallicciardi et al. |
| D584,249 S | 1/2009 | Tani et al. |
| D589,010 S | 3/2009 | Di Stefano |
| D589,011 S | 3/2009 | Di Stefano |
| D590,400 S | 4/2009 | Hoogerdijk |
| 7,559,469 B2 | 7/2009 | Noda et al. |
| 7,559,478 B2 | 7/2009 | Amiot et al. |
| D601,520 S | 10/2009 | Yokota et al. |
| 7,605,453 B2 | 10/2009 | Stampka et al. |
| 7,615,855 B2 | 11/2009 | Osako et al. |
| 7,630,203 B1 | 12/2009 | Chen et al. |
| 7,630,209 B2 | 12/2009 | Kim et al. |
| 7,686,228 B2 | 3/2010 | Oddou et al. |
| 7,719,846 B2 | 5/2010 | Frallicciardi et al. |
| 7,726,578 B2 | 6/2010 | Froger et al. |
| 7,764,977 B2 | 7/2010 | Kemppinen |
| 7,770,800 B2 | 8/2010 | Martinez et al. |
| 7,837,122 B2 | 11/2010 | Martinent et al. |
| 7,855,895 B2 | 12/2010 | Kim et al. |
| 7,871,007 B2 | 1/2011 | Amiot et al. |
| D632,696 S | 2/2011 | Koh et al. |
| 7,997,498 B2 | 8/2011 | Phillips |
| 8,107,246 B2 | 1/2012 | Fidalgo et al. |
| 8,123,135 B2 | 2/2012 | Phillips |
| 8,282,010 B2 | 10/2012 | Heusmann |
| 8,296,233 B2 | 10/2012 | Robbins et al. |
| 8,297,518 B2 | 10/2012 | Yamazaki et al. |
| 8,336,784 B2 | 12/2012 | Phillips |
| D691,610 S | 10/2013 | Lepp et al. |
| D692,005 S | 10/2013 | Lepp et al. |
| D702,694 S | 4/2014 | Lepp et al. |
| 2001/0002874 A1 | 6/2001 | Sakamoto et al. |
| 2001/0011962 A1 | 8/2001 | Fletout et al. |
| 2002/0050527 A1 | 5/2002 | Nishikawa et al. |
| 2002/0160630 A1 | 10/2002 | Kashima |
| 2002/0169943 A1 | 11/2002 | Rabeler |
| 2003/0085288 A1 | 5/2003 | Luu |
| 2003/0184978 A1 | 10/2003 | LoBianco et al. |
| 2003/0213849 A1 | 11/2003 | Luu |
| 2004/0124248 A1 | 7/2004 | Selker |
| 2004/0223305 A1 | 11/2004 | Amiot et al. |
| 2004/0232246 A1 | 11/2004 | Dhers et al. |
| 2004/0259423 A1 | 12/2004 | Elbaz et al. |
| 2005/0218235 A1 | 10/2005 | Chang et al. |
| 2005/0230485 A1 | 10/2005 | Ross et al. |
| 2005/0231921 A1 | 10/2005 | Noda et al. |
| 2005/0252978 A1 | 11/2005 | Nishizawa et al. |
| 2006/0011731 A1* | 1/2006 | Anders et al. ............ 235/492 |
| 2006/0054709 A1 | 3/2006 | Lee |
| 2006/0118639 A1 | 6/2006 | Kean et al. |
| 2007/0063055 A1 | 3/2007 | Graf et al. |
| 2007/0075132 A1 | 4/2007 | Kean |
| 2007/0108294 A1 | 5/2007 | Rossiter |
| 2007/0108298 A1 | 5/2007 | Kalck et al. |
| 2007/0125866 A1 | 6/2007 | Nishizawa et al. |
| 2007/0152072 A1 | 7/2007 | Frallicciardi et al. |
| 2007/0153487 A1 | 7/2007 | Frallicciardi et al. |
| 2007/0176007 A1 | 8/2007 | Priya et al. |
| 2007/0252259 A1 | 11/2007 | Geva et al. |
| 2007/0270039 A1 | 11/2007 | Froger et al. |
| 2008/0011859 A1 | 1/2008 | Phillips |
| 2008/0035740 A1 | 2/2008 | Tanner |
| 2008/0048042 A1 | 2/2008 | Degauque et al. |
| 2008/0054078 A1 | 3/2008 | Tanner |
| 2008/0061148 A1 | 3/2008 | Tanner |
| 2008/0061149 A1 | 3/2008 | Tanner |
| 2008/0061150 A1 | 3/2008 | Phillips |
| 2008/0061151 A1 | 3/2008 | Phillips |
| 2008/0083831 A1 | 4/2008 | Perez Lafuente et al. |
| 2008/0128514 A1 | 6/2008 | Sabbah et al. |
| 2008/0135626 A1 | 6/2008 | Reignoux et al. |
| 2008/0149730 A1 | 6/2008 | Hubmer et al. |
| 2008/0149737 A1 | 6/2008 | Ohshima |
| 2008/0233804 A2* | 9/2008 | Froger et al. ............ 439/638 |
| 2008/0245879 A1 | 10/2008 | Artigue et al. |
| 2008/0251587 A1 | 10/2008 | Martinent et al. |
| 2008/0257967 A1 | 10/2008 | Nishizawa et al. |
| 2009/0040695 A1 | 2/2009 | Fidalgo et al. |
| 2009/0065587 A1 | 3/2009 | Phillips |
| 2009/0065917 A9 | 3/2009 | Geva et al. |
| 2009/0100511 A1 | 4/2009 | Phillips |

(56) References Cited

U.S. PATENT DOCUMENTS

| | | | |
|---|---|---|---|
| 2009/0159694 | A1 | 6/2009 | Rikkola et al. |
| 2010/0078486 | A1 | 4/2010 | Kai et al. |
| 2010/0107845 | A1 | 5/2010 | Baron |
| 2010/0230498 | A1 | 9/2010 | Atherton |
| 2010/0258639 | A1 | 10/2010 | Florek et al. |
| 2010/0282855 | A1 | 11/2010 | Rancien et al. |
| 2011/0068176 | A1 | 3/2011 | Bashan et al. |
| 2011/0068178 | A1 | 3/2011 | Gebhart |
| 2011/0253794 | A1 | 10/2011 | Koskelainen |
| 2012/0018522 | A1 | 1/2012 | Le Garrec et al. |
| 2012/0048948 | A1 | 3/2012 | Bertin et al. |
| 2012/0056001 | A1 | 3/2012 | Dokai et al. |
| 2012/0104104 | A1 | 5/2012 | Hofmann |
| 2012/0225691 | A1 | 9/2012 | Desjeux et al. |
| 2013/0068844 | A1 | 3/2013 | Bosquet et al. |
| 2014/0166763 | A1 | 6/2014 | Scarlatella et al. |

FOREIGN PATENT DOCUMENTS

| | | |
|---|---|---|
| DE | 19906570 | 8/2000 |
| DE | 102009016773 | 10/2010 |
| EP | 001325765-0001 | 7/2012 |
| EP | 001325765-0002 | 7/2012 |
| EP | 001325765-0003 | 7/2012 |
| EP | 001325765-0004 | 7/2012 |
| EP | 001325765-0005 | 7/2012 |
| EP | 001325765-0006 | 7/2012 |
| EP | 001325765-0007 | 7/2012 |
| EP | 001325765-0008 | 7/2012 |
| EP | 001325765-0009 | 7/2012 |
| EP | 001325765-00010 | 7/2012 |
| EP | 001325765-00011 | 7/2012 |
| EP | 001325765-00012 | 7/2012 |
| EP | 001325765-00013 | 7/2012 |
| EP | 001325765-00014 | 7/2012 |
| FR | 2882175 | 8/2006 |

OTHER PUBLICATIONS

ETSI, "ETSI TS 102 221," V9.2.0, Technical Specification, Oct. 2010, 179 pages.
ETSI, ETSI TS 102 412, V11.0.0, Technical Specification, May 2011, 90 pages.
ETSI, ETSI TS 102 600, V10.0.0, Techincal Specification, Oct. 2010, 26 pages.
ETSI, ETSI TS 102 613, V9.2.0, Mar. 2011, 57 pages.
ETSI, ETSI TS 102 671, V9.1.0, Sep. 2011, 21 pages.
TE Connectivity, "Recommendations 4FF SIM for ETSI," Mar. 30, 2011, 9 pages.
"3GPP TSG-CT6#55," Distributing mini-UICC as punch out from Plug-in or double punch-out from ID-1, Kyoto, Japan, May 11-14, 2010, 2 pages.
"ETSI TC SCP Meeting #51," San Diego, CA, Jul. 21-22, 2011, 5 pages.
"ETSI SCP TEC Meeting #40," Sophia Antipolis, France, Aug. 29-Sep. 1, 2011, 5 pages.
"ETSI TC SCP TEC #40," Sophia-Antipolis, France, Aug. 26-Sep. 1, 2011, 1 page.
"iPhone Teardown," ©2011 iFixit, 4 pages.
International Organization for Standardization, "Identification Cards-Physical Characteristics," ISO/IEC 7810, Nov. 1, 2003, 26 pages.
International Organization for Standardization, "Identification Cards-Integrated Circuit Cards," ISO/IEC 7816-1, Feb. 15, 2011, 8 pages.
International Organization for Standardization, "Identification Cards-Integrated Circuit Cards," ISO/IEC 7816-2, Oct. 15, 2007, 14 pages.
International Organization for Standardization, "Identification Cards-Integrated Circuit Cards," ISO/IEC 7816-3, Nov. 1, 2006, 58 pages.
SMK, "Push-Push Style Micro SIM Memory Card Connector," retrieved from www.smkusa.com/usa/featured_products/mem/, Dec. 12, 2011, 4 pages.
State Intellectual Property Office of P.R. China, "Office Action," with unverified redacted English translation, issued in connection with Chinese application serial No. 201230153596, issued Sep. 18, 2012, 2 pages.
United States Patent and Trademark Office, "Non-Final Office Action," issued in connection with U.S. Appl. No. 29/405,848, issued Oct. 2, 2012, 4 pages.
United States Patent and Trademark Office, "Non-Final Office Action," issued in connection with U.S. Appl. No. 29/405,845, issued Sep. 27, 2012, 4 pages.
Canadian Intellectual Property Office, "Office Action," issued in connection with Canadian application serial No. 145596, issued Oct. 26, 2012, 2 pages.
United States Patent and Trademark Office, "Ex Parte Quayle Action," issued in connection with U.S. Appl. No. 29/405,845, mailed Feb. 26, 2013, 12 pages.
United States Patent and Trademark Office, "Non-Final Office Action," issued in connection with U.S. Appl. No. 29/432,138, mailed Jan. 11, 2013, 9 pages.
United States Patent and Trademark Office, "Non-Final Office Action," issued in connection with U.S. Appl. No. 29/432,136, mailed Jan. 7, 2013, 9 pages.
United States Patent and Trademark Office, "Notice of Allowance," issued in connection with Design U.S. Appl. No. 29/405,845, on May 21, 2013 (9 pages).
United States Patent and Trademark Office, "Notice of Allowance," issued in connection with Design U.S. Appl. No. 29/432,136, on May 29, 2013 (21 pages).
United States Patent and Trademark Office, "Supplemental Notice of Allowance," issued in connection with Design U.S. Appl. No. 29/432,136, on Sep. 16, 2013 (2 pages).
United States Patent and Trademark Office, "Supplemental Notice of Allowance," issued in connection with Design U.S. Appl. No. 29/405,845, on Jul. 1, 2013 (2 pages).
United States Patent and Trademark Office, "Ex parte Quayle," issued in connection with Design U.S. Appl. No. 29/432,138, on Jun. 21, 2013 (3 pages).
United States Patent and Trademark Office, "Notice of Allowance," issued in connection with Design U.S. Appl. No. 29/432,138, on Nov. 13, 2013 (9 pages).
United States Patent and Trademark Office, "Supplemental Notice of Allowance," issued in connection with Design U.S. Appl. No. 29/432,138, on Feb. 28, 2014 (2 pages).
Canadian Intellectual Property Office, "Exam Report," issued in Canadian Application No. 145573, on Apr. 17, 2013 (2 pages).
Canadian Intellectual Property Office, "Exam Report," issued in Canadian Application No. 2792292, on Jun. 2, 2014 (4 pages).
European Patent Office, "Extended European Search Report," issued in connection with European Application No. 12155565.0, on Jul. 9, 2014 (13 pages).

* cited by examiner

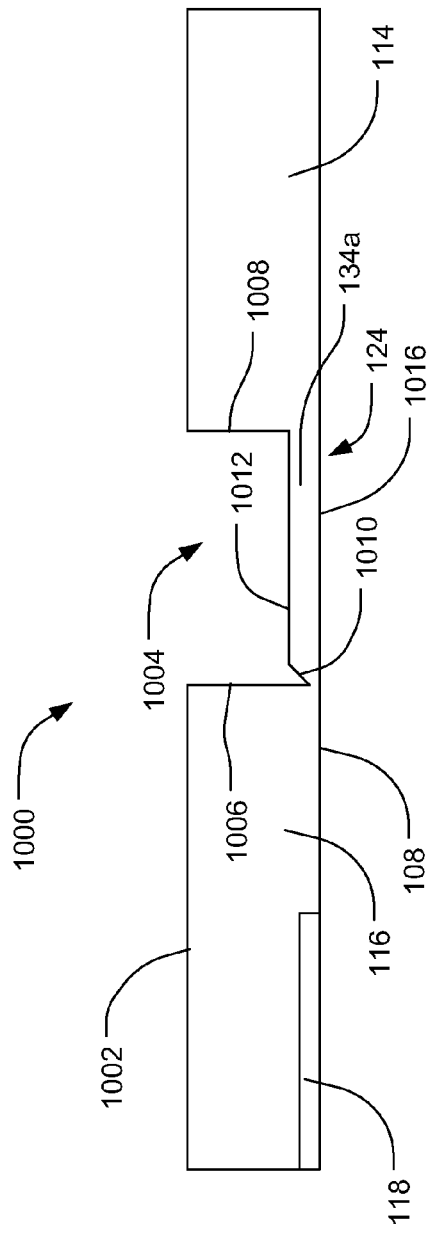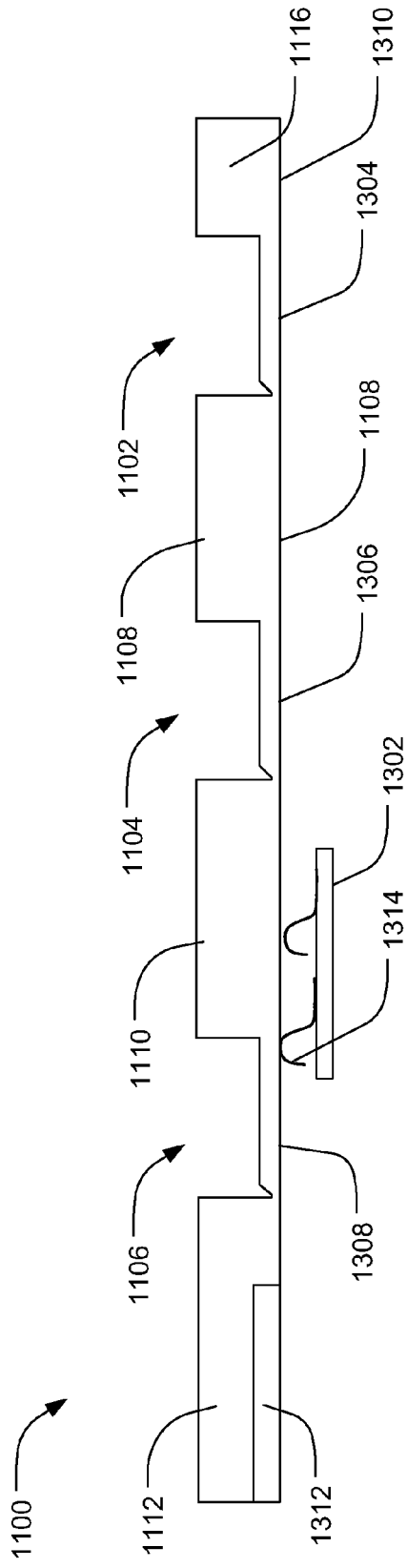

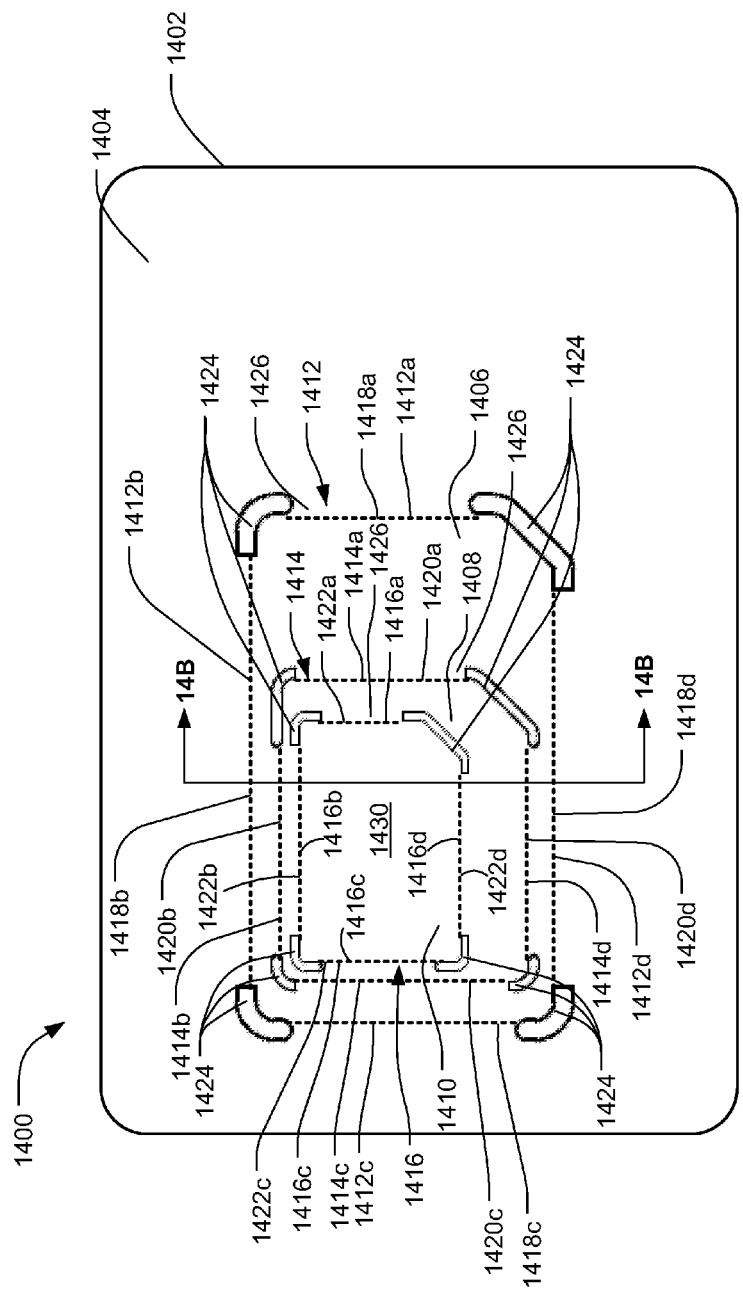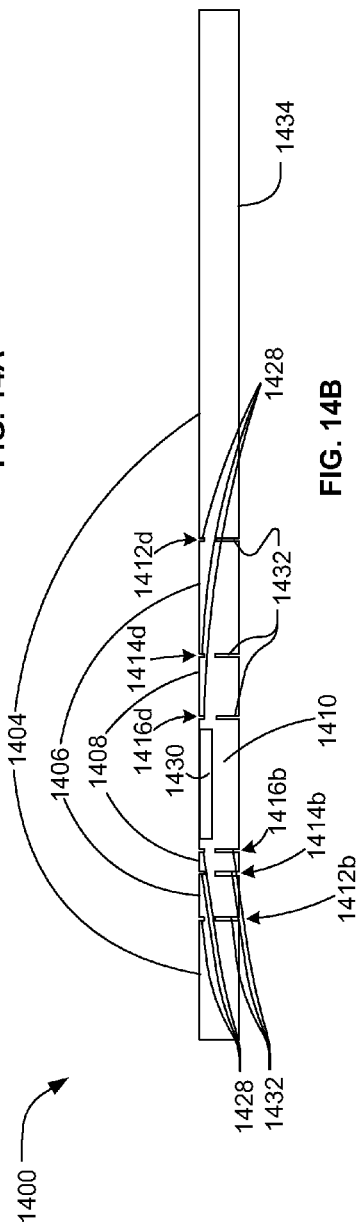
FIG. 14A
FIG. 14B

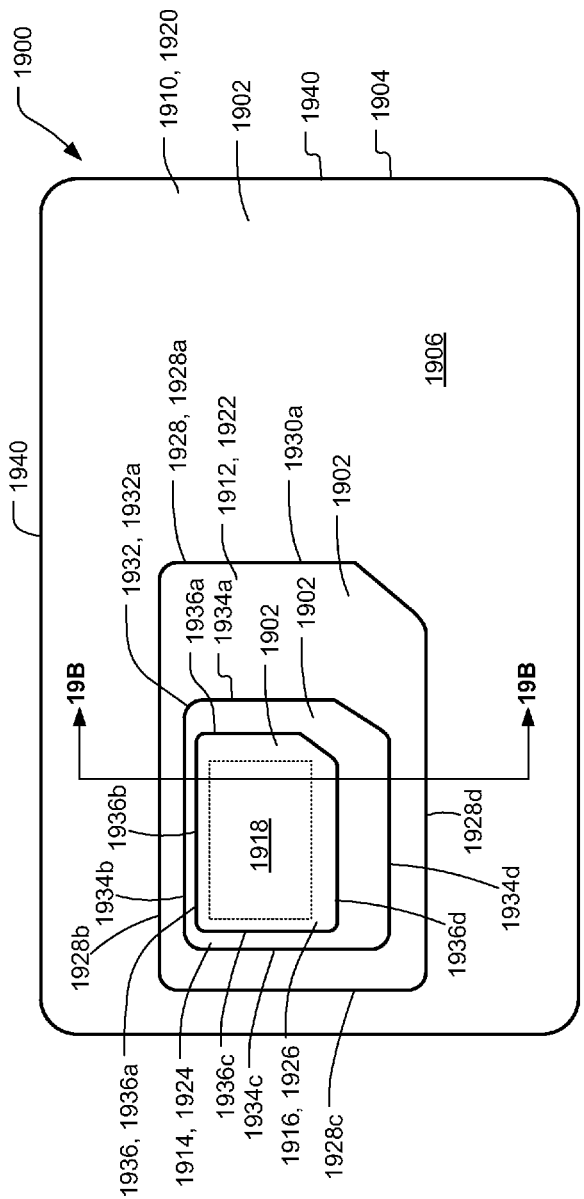
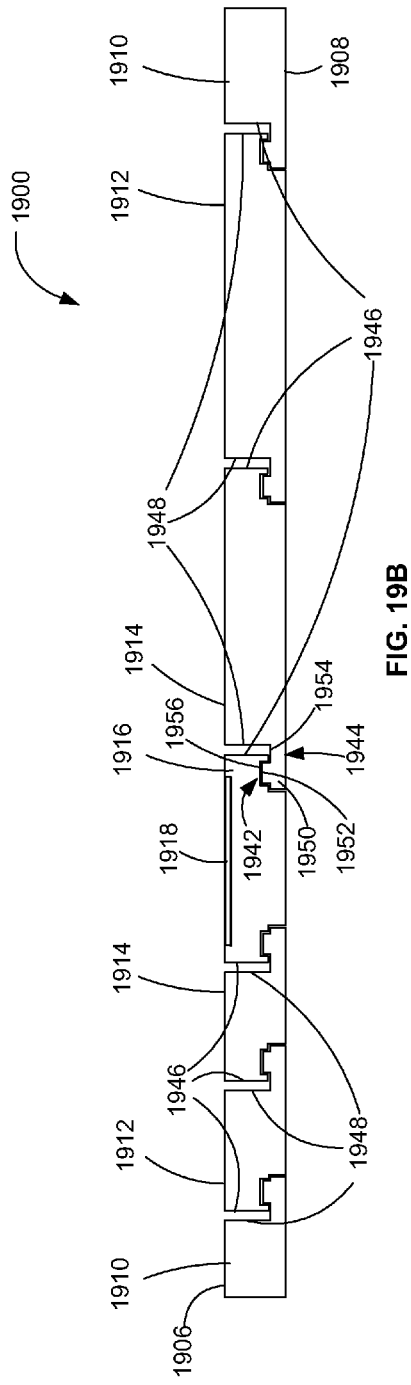

UNIVERSAL INTEGRATED CIRCUIT CARD APPARATUS AND RELATED METHODS

CROSS-SECTION TO RELATED APPLICATIONS

This patent arises from a continuation-in-part of U.S. Design patent application Ser. No. 29/405,845, filed Nov. 7, 2011, which is hereby incorporated herein by reference in its entirety.

FIELD OF DISCLOSURE

The present disclosure relates to universal integrated circuit cards, including but not limited to, universal integrated circuit cards and related methods.

BACKGROUND

Electronic devices, including portable electronic devices, have gained widespread use and may provide a variety of functions including, for example, telephonic, electronic messaging, and other personal information manager (PIM) application functions. Portable electronic devices include, for example, several types of mobile stations such as simple cellular telephones, smart telephones, tablet computers, wireless personal digital assistants (PDAs), and laptop computers with wireless 802.11 or Bluetooth capabilities.

Electronic devices such as, for example, portable electronic devices often connect to a network (e.g., a mobile network). These devices often employ a smart card or Universal Integrated Circuit Card (hereinafter UICC) to identify a subscriber for network access. For example, a UICC can store a Subscriber Identity Module (e.g., a SIM card, USIM card, RUIM, CSIM, etc.) that authenticates a subscriber to a network such as a mobile network. The UICC may also store other subscriber-related information for non-telecom applications. For example, the UICC can enable contactless data flow for identity, security, banking, payment applications and/or any other application associated with transmitting and securing personal data of a user.

BRIEF DESCRIPTION OF THE DRAWINGS

FIG. 10 is a partial cross-sectional view of the example UICC apparatus of FIG. 1 taken along line 10-10.

FIG. 13 is a cross-sectional view taken along line 13-13 of the example UICC apparatus of FIG. 11 illustrating a punch-out feature relative to an input device.

FIG. 14A illustrates another example UICC apparatus disclosed herein having another example punch-out feature disclosed herein.

FIG. 14B is a cross-sectional view of the example UICC apparatus of FIG. 14A taken along line 14B-14B of FIG. 14A.

FIG. 19A illustrates another example UICC apparatus having another example punch-out feature disclosed herein.

FIG. 19B is a cross-sectional shape of the example UICC apparatus taken along line 19B-19B of FIG. 19A.

DETAILED DESCRIPTION

Figure 1:
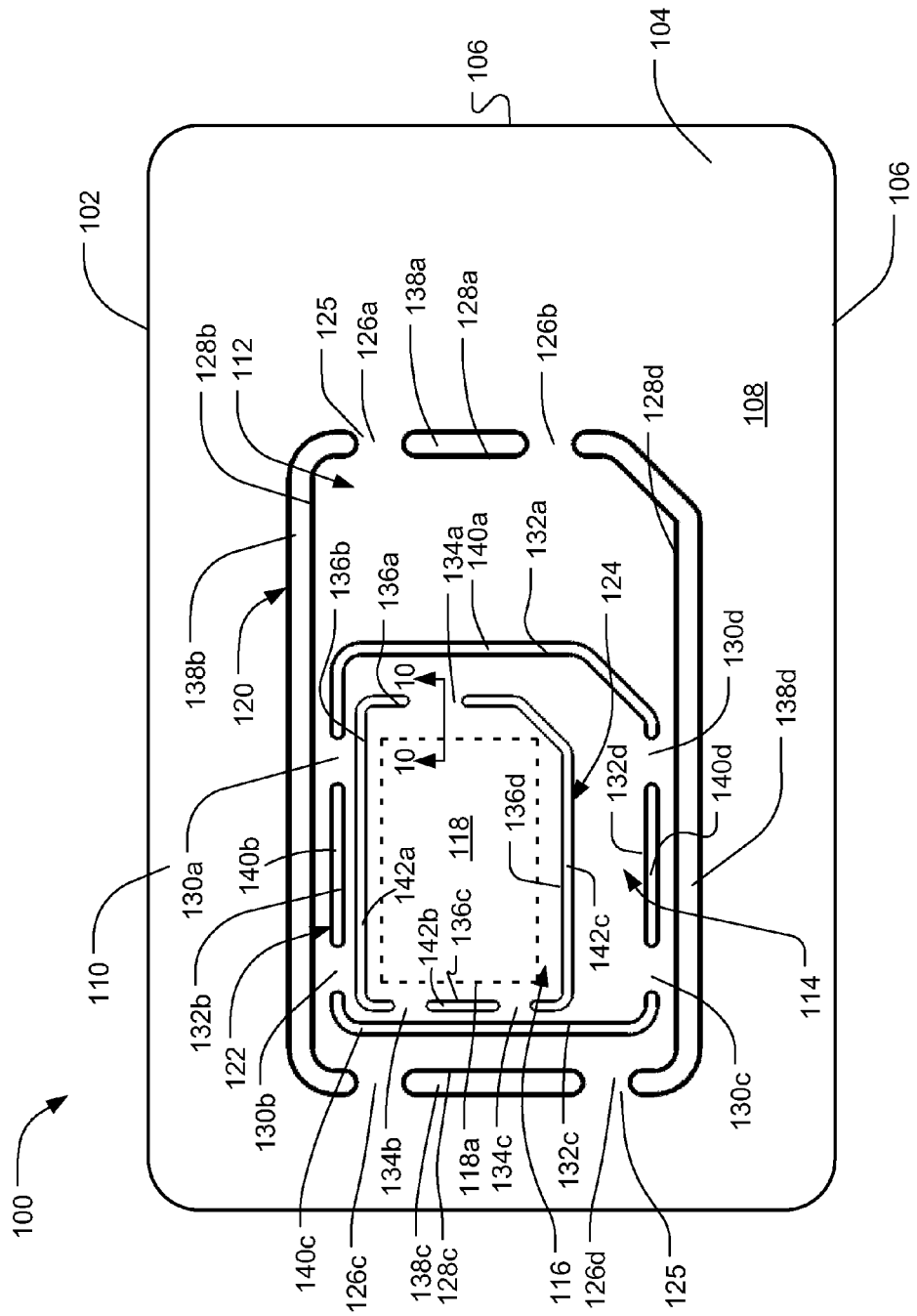
FIG. 1 illustrates an example UICC apparatus disclosed herein.

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity. Additionally, several examples have been described throughout this specification. Any features from any example may be included with, a replacement for, or otherwise combined with other features from other examples.

Smart cards or Universal integrated circuit cards (UICCs) are often used as a Subscriber Identity Module (e.g., SIM card, USIM card, RUIM card or CSIM card) in a portable electronic device such as a mobile device. A Subscriber Identity Module is a network access application that is stored in the UICC to authenticate a subscriber to a network.

Currently, a profile or dimensional envelope of conforming UICCs are configured according to certain standards or form factors provided by, for example, the European Telecommunications Standards Institute (ETSI) and the International Standard Organization (ISO). In particular, the form factor standards are defined by International Standard Organization ISO/IEC 7810, ISO/IEC 7816-1, ISO/IEC 7816-2, ISO/IEC 7816-3 and/or Technical Specification of the European Telecommunications Standards Institute ETSI TS 102 221. For example, some current standards define ID-1 card standard, plug-in UICC standard and a mini-UICC standard. Each of the different form factors defines a different dimensional envelope or profile. More specifically, the ID-1 card standard provides a first dimensional profile that is larger than a dimensional profile of the plug-in UICC and the mini-UICC, and the plug-in UICC standard provides a dimensional profile that is larger than the dimensional profile of the mini-UICC.

Additionally, an input device or card reader is typically configured to receive a dedicated UICC form factor standard (e.g., a UICC conforming to only one standard). In particular, an input device or card reader is often configured with relatively tight tolerance specifications according to a conforming UICC standard to prevent movement of the UICC and maintain proper alignment of the UICC when the UICC is disposed within the input device. Movement or misalignment of the UICC within the input device may affect an electrical connectivity between the UICC and the input device and/or may cause damage to the input device. Further, any dimensional inconsistencies in a UICC (e.g., a side surface, edge or end) may cause the UICC to become jammed within the input device and/or may cause damage to the input device.

However, electronic devices or mobile data devices employ the various conforming UICCs noted above. As a result, due to the various available form factors and the inability of an input device to receive multiple conforming UICCs, a mobile network provider typically has to keep in inventory various conforming UICCs. However, maintaining a proper inventory of the various conforming UICCs may be difficult and/or may significantly increase costs.

To facilitate handling and/or to reduce inventory, a plug-in UICC and/or a mini-UICC may be packaged and delivered to, for example, a mobile network operator in the ID-1 card. A tab, for example, may be employed in the ID-1 card adjacent the plug-in UICC and/or the mini-UICC to enable a user to remove or punch out the plug-in UICC and/or the mini-UICC from the ID-1 card.

However, a tab punch-out may cause dimensional inconsistencies in a UICC (e.g., a surface of a side wall or edge) removed from the ID-1 card. Typically, dimensional inconsistencies are often caused by remnants of a tab when a UICC is removed from an ID-1 card. As a result, the removed UICC may not properly slide and/or nest within an input device or card reader. In some instances, a tab remnant of a removed UICC may cause the UICC to become jammed within the input device. In some instances, a punch-out feature formed in the ID-1 card may cause a recess or void to form adjacent a surface of the ID-1 card having the electrical contacts. As a result, the void may catch or damage an electrical contact of an input device.

Further, in some instances, a user may retain a frame portion defining a larger form factor UICC (e.g., the ID-1 or the plug-in UICC) for later use after a smaller form factor UICC is removed from the frame portion. In such instances, a user may attempt to nest the previously removed UICC in the frame portion and dispose the frame portion with the nested UICC in an input device adapted to receive the larger UICC defined by the frame portion. However, because the previously removed UICC nests within the frame portion, the previously removed UICC can move and/or become misaligned within the input device.

Example device smart cards or UICC apparatus and related methods described herein generally couple or package a plurality of UICCs. In particular, example UICC apparatus and related methods described herein may include a plurality of punch-out features to enable different UICCs to be removed from the UICC apparatus. More specifically, the punch-out features may define respective perimeters of the UICCs conforming to various form factor standards provided by, for example ISO/IEC 7810, ISO/IEC 7816-1, 7816-2, 7816-3 and/or ETSI TS 102 221. For example, a smaller form factor UICC (e.g., a mini-UICC) may be coupled to a larger form factor UICC (e.g., a plug-in UICC) via a punch-out feature.

In particular, the punch-out feature may enable a smaller conforming UICC to be removed from a larger conforming UICC having a relatively smooth edge, end and/or surface. In other words, a punch-out feature of an example UICC apparatus disclosed herein may enable a UICC to be removed from the UICC apparatus without remnants of the punch-out feature being attached to a surface, end or edge of the removed UICC. Instead, the remnants of the punch-out feature are configured to remain attached or coupled to a non-removed portion of UICC apparatus. As a result, a UICC removed from an example UICC apparatus described herein significantly reduces misalignment, jamming and/or damage to an input device or card reader when the removed UICC is inserted in the input device. Additionally or alternatively, because the punch-out feature remnants remain attached to a non-removed UICC, the removed UICC more closely or accurately conforms to the form factor standards or intended dimensions.

Additionally or alternatively, a punch-out feature described herein may be flush or substantially even relative to a surface of the UICC apparatus having one or more electrical contacts. In this manner, a first punch-out feature defining a first or smaller UICC perimeter (e.g., a mini-UICC perimeter) does not interfere with an electrical contact of an input device or card reader when a larger UICC (e.g., a plug-in UICC), including the punch-out feature defining the smaller UICC, is disposed in an input device.

In some examples disclosed herein, an example modular UICC apparatus or device smart card employs a modular snap-fit feature. Unlike known UICC apparatus, the modular UICC employs a plurality of separate cards that can be assembled via a modular snap-fit feature. In addition, the example modular UICC also enables a smaller sized, previously detached UICC to be reattached or re-coupled to a larger sized UICC from which the smaller UICC was removed. To that end, a UICC having a modular snap-fit feature may be reuseable to form a larger conforming UICC.

Further, example UICC apparatus disclosed herein may employ a collapsible feature to enable a frame portion of the UICC apparatus to collapse when a smaller conforming UICC is removed from the frame portion. As a result, the frame portion cannot be reused as a holder to receive the previously removed UICC for use in an input device configured to receive a conforming UICC defined by the frame portion and the nested UICC.

FIG. 1 illustrates an example device smart card or UICC apparatus 100 disclosed herein. As shown in FIG. 1, the UICC apparatus 100 comprises a body or carrier 102 defining a first or front side 104 and a second or rear side opposite the first side 104. As shown in FIG. 1, the carrier 102 of the illustrated example includes a generally rectangular shape having peripheral edges 106 that define a first surface 108. In this illustrated example, the first surface 108 provides a first perimeter that conforms to a first UICC form factor standard such as, for example, a ID-1 card standard provided by ISO/IEC 7810, ISO/IEC 7816-1 and/or 7816-2 (e.g., credit card sized UICC). Thus, the carrier 102 may implement a first UICC 110 of the UICC apparatus 100.

In addition, the example UICC apparatus 100 of the illustrated example further defines a second UICC 112, a third UICC 114, and a fourth UICC 116. In particular, the second UICC 112 and the third UICC 114 may conform in accordance with current standards provided by ISO/IEC 7810, ISO/IEC 7816-2 and 7816-3 and/or ETSI TS 102 221.

The fourth UICC 116 may conform to any standards or dimensional envelope. For example, the fourth UICC 116 may conform to a future form factor standard provided by the International Standard Organization and/or the European Telecommunications Standards Institute. For example, the fourth UICC 116 may have a height of between approximately 11.8 and 12 millimeters and width of between approximately 8.7 and 8.9 millimeters. In other examples, the height may be between about 10.9 and 11.1 millimeters and the width may be between about 8.9 and 9.7 millimeters.

Further, in some examples, the fourth UICC 116 may have a thickness of between approximately 0.64 and 0.70 millimeters. In some examples, the UICC 116 may have a thickness of between approximately 0.68 and 0.84 millimeters.

Additionally, the fourth UICC 116 of the illustrated example defines a UICC common surface 118 having a perimeter illustrated by a dashed line 118*a* in the example of FIG. 1. More specifically, the UICC common surface 118 of the illustrated example supports an integrated circuit or microprocessor and a plurality of electrical contacts to enable communication between the microprocessor and a host (e.g., a computer, a point of sale terminal, a mobile device, a non-mobile device, a remote terminal, etc.). The host typically employs an input device (e.g., a card reader) to accept the body and complete a circuit with the electrical contacts to enable communication (e.g., transfer data) between the UICC and the host. In addition, the input device provides power to the UICC apparatus 100 and also performs protocol conversation and/or reformats data for use by the UICC apparatus 100.

The plurality of electrical contacts communicatively couples the integrated circuit to an electronic device. In general, a classification of the electrical contacts may be in accordance with the classification of electrical contacts provided by standards ISO/IEC 7816-2 and 7816-3 and/or ETSI TS 102 221. For example, although not depicted herein, the electrical contacts may include a supply voltage contact C1, a reset contact C2, a clock contact C3, a first auxiliary contact C4, a ground contact C5, a single-wire protocol contact C6, an input/output contact C7, and a second auxiliary contact C8. In some examples, the electrical contacts C4 and C8 can implement a high speed USB interface between the UICC and the host or terminal. Also, the single-wire protocol contact C6 and/or the first and second auxiliary contacts C4 and C8 are optional and may be omitted. In other examples, the UICC apparatus 100 may employ any other type of electrical contacts other than those described or represented by electrical contacts C1-C8. The plurality of electrical contacts may be disposed on the UICC common surface 118 in a staggered pattern, an offset pattern, a single-row pattern or configuration and/or any other suitable pattern(s). The electrical contacts may be a unitary sheet composed of electrically conductive material (e.g., copper, etc.) having divided contacts C1-C8 that may be coupled to the UICC common surface 118 via, for example, solder, or any other fastener(s).

Turning in detail to FIG. 1, to removably couple the UICCs 112, 114 and 116 to the carrier 102, the example UICC apparatus 100 employs a plurality of punch-out features. More specifically, a first cutout profile or punch-out feature 120 formed in the first surface 108 of the carrier 102 and adjacent the UICC common surface 118 defines the second UICC 112, a second cutout profile or punch-out feature 122 formed in the first surface 108 of the carrier 102 and adjacent the UICC common surface 118 defines the third UICC 114, and a third cutout profile or punch-out feature 124 formed in the first surface 108 of the carrier 102 and adjacent the UICC common surface 118 defines the fourth UICC 116.

More specifically, the first punch-out feature 120 substantially surrounds or encompasses the UICC common surface 118 and the second and third punch-out features 122 and 124. In the illustrated example, the UICC common surface 118 and the first punch-out feature 120 define a second perimeter that conforms to a plug-in UICC.

Similarly, the second punch-out feature 122 of the illustrated example substantially surrounds or encompasses the UICC common surface 118 and the third punch-out feature 124, and is disposed inside the second perimeter defined by the first punch-out feature 120. In other words, the second punch-out feature 122 of the illustrated example is disposed between the UICC common surface 118 and the first punch-out feature 120. The UICC surface 118 and the second punch-out feature 122 of the illustrated example may define a third perimeter that conforms to a mini-UICC.

Likewise, the third punch-out feature 124 of the illustrated example substantially surrounds or encompasses the UICC common surface 118 and is disposed inside the third perimeter defined by the second punch-out feature 122. In other words, the third punch-out feature 124 of the illustrated example is disposed between the UICC common surface 118 and the second punch-out feature 122. The UICC common surface 118 and the third punch-out feature 124 of the illustrated example may define a fourth perimeter that may conform to any desired standard such as, for example, a standard that defines a micro-UICC standard.

Thus, as shown in FIG. 1, the first UICC 110 has a dimensional profile that is greater than the dimensional profiles of the respective UICCs 112, 114 and 116; the second UICC 112 has a dimensional profile that is greater than the dimensional profiles of the third and fourth UICCs 114 and 116; and the third UICC 114 has a dimensional profile that is greater than the dimensional profile of the fourth UICC 116.

The punch-out features 120, 122 and 124 of the illustrated example employ a plurality of tabs. For example, one or more tabs 126*a-d* may be formed adjacent one or more peripheral edges 128*a-d* of the second UICC 112; one or more tabs 130*a-d* may be formed adjacent one or more peripheral edges 132*a-d* of the third UICC 114; and one or more tabs 134*a-c* may be formed adjacent one or more peripheral edges 136*a-d* of the fourth UICC 116. For example, the peripheral edges 128*a-b*, 132*a-b* and 136*a-b* of the illustrated example define respective ends of the UICCs 112, 114, and 116 and the peripheral edges 128*c-d*, 132*c-d* and 136*c-d* of the illustrated example define respective sides of the UICCs 112, 114 and 116.

To prevent accidental punch out of a smaller UICC (e.g., the fourth UICC 116) from the carrier 102 when punching out a larger UICC (e.g., the third UICC 114), the orientation of the tabs 126*a-d*, 130*a-d* and 134*a-c* in the illustrated example alternate between the ends and the sides of the respective UICCs 112, 114 and 116 with each progressively smaller UICC 112, 114 and 116. In other words, the respective tabs 126*a-d* and 130*a-d* of the second and fourth UICCs 112 and 116 are formed along the respective peripheral edges 128*a-b* and 136*a-b*, and the tabs 130*a-d* of the third UICC 114 are formed along the peripheral edges 132*c-d*.

To form a punch-out feature or a tab in the carrier 102, one or more voids are formed by removing material of the first surface 108. For example, to form the first punch-out feature 120 of the illustrated example, respective voids 138*a-d* are formed between the respective tabs 126*a-d* adjacent the peripheral edges 128*a-d* of the second UICC 112. Similarly, to form the second punch-out feature 122 of the illustrated example, respective voids 140*a-d* are formed between the respective tabs 130*a-d* adjacent the peripheral edges 132*a-d* of the third UICC 114. Likewise, to form the first punch-out feature 120 of the illustrated example, respective voids 142*a-c* are formed between the respective tabs 134*a-c* adjacent the peripheral edges 136*a-d* of the fourth UICC 116.

Figure 2:
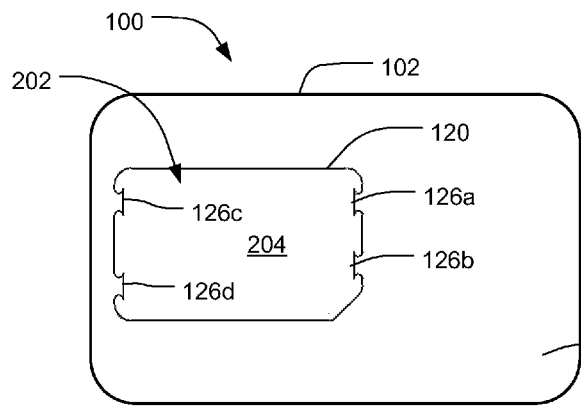
FIG. 2 illustrates the UICC apparatus of FIG. 1 having a first portion removed.

FIG. 2 illustrates the UICC apparatus 100 of FIG. 1 with a portion 202 of the carrier 102 removed. As shown, a void 204 is formed in the first surface 108 representative of the removed portion 202. In the illustrated example of FIG. 2, the second UICC 112 represents the removed portion 202. In particular, the second UICC 112 is removed from the carrier 102 along the second perimeter defined by the first punch-out feature 120. Additionally, as illustrated in FIG. 2, the first punch-out feature 120 or the tabs 126a-d, which retain or removably attach the second UICC 112 to the carrier 102 prior to being removed, are configured to remain attached to a first frame portion 206 defined by the first surface 108 when the second UICC 112 is removed from the carrier 102.

Figure 3:
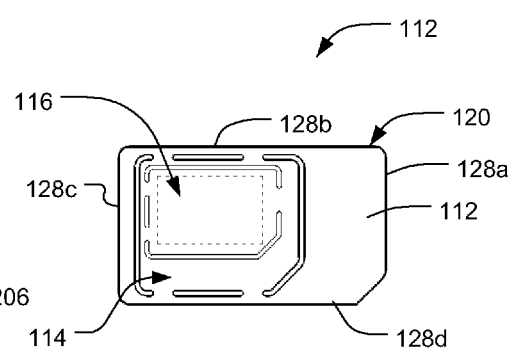
FIG. 3 illustrates the removed first portion of FIG. 2.

FIG. 3 illustrates the second UICC 112 after it has been removed from the carrier 102. As shown in FIG. 3, the peripheral edges 128a-d of the second UICC 112 are relatively smooth and substantially devoid of tab remnants. In other words, remnants of the first punch-out feature 120 and/or the tabs 126a-d remain attached to the first frame portion 206 and not the peripheral edges 128a-d of the second UICC 112.

Figure 4:
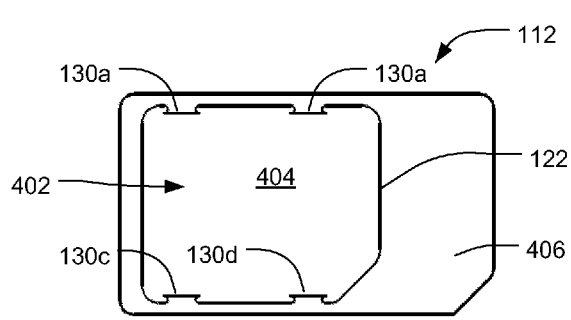
FIG. 4 illustrates an enlarged view of the removed first portion of FIG. 3 having a second portion removed.

FIG. 4 illustrates the second UICC 112 with a portion 402 of the second UICC 112 removed. As shown, a void 404 is formed in the second UICC 112 representative of the removed portion 402. In the illustrated example of FIG. 4, the third UICC 114 represents the removed portion 402. In particular, the third UICC 114 is removed from the carrier 102 along the third perimeter defined by the second punch-out feature 122. Additionally, as illustrated in FIG. 4, the second punch-out feature 122 or the tabs 130a-d, which retain or removably attach the third UICC 114 to the second UICC 112 prior to being removed, are configured to remain attached to a second frame portion 406 defined by the second UICC 112 when the third UICC 114 is removed from the second UICC 112.

Figure 5:
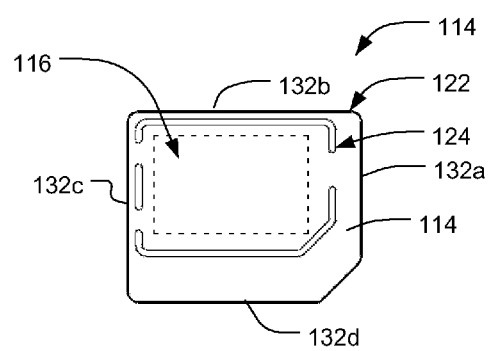
FIG. 5 illustrates the removed second portion.

FIG. 5 illustrates the third UICC 114 after it has been removed or detached from the second UICC 112. As shown in FIG. 5, the peripheral edges 132a-d of the third UICC 114 are relatively smooth and substantially devoid of tab remnants. In other words, remnants of the second punch-out feature 122 and/or the tabs 130a-d remain attached to the second frame portion 406 and not the peripheral edges 132a-d of the third UICC 114.

Figure 6:
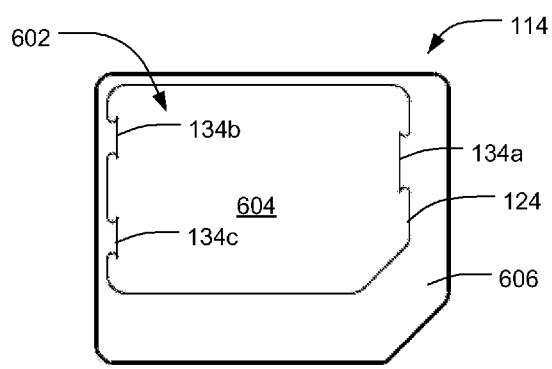
FIG. 6 illustrates an enlarged view of the removed second portion of FIG. 5 having a third portion removed.

FIG. 6 illustrates the third UICC 114 with a portion 602 of the third UICC 114 removed. As shown, a void 604 is formed in the third UICC 114 representative of the removed portion 602. In the illustrated example of FIG. 6, the fourth UICC 116 represents the removed portion 602. In particular, the fourth UICC 116 is removed from the third UICC 114 along the fourth perimeter defined by the third punch-out feature 124. Additionally, as illustrated in FIG. 6, the third punch-out feature 124 or the tabs 134a-c, which retain or removably attach the fourth UICC 116 to the third UICC 114 prior to being removed, are configured to remain attached to a third frame portion 606 defined by the third UICC 114 when the fourth UICC 116 is removed from the third UICC 114.

Figure 7:
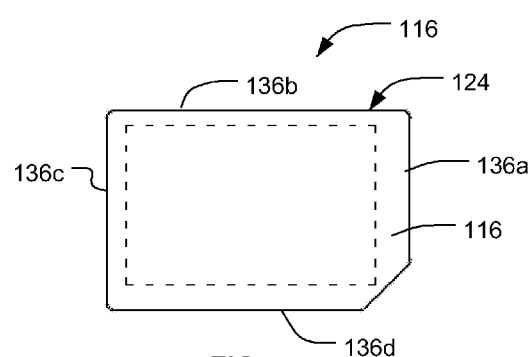
FIG. 7 illustrates the removed third portion.

FIG. 7 illustrates the fourth UICC 116 after it has been removed from the third UICC 114. As shown in FIG. 7, the peripheral edges 136a-d of the fourth UICC 116 are relatively smooth and substantially devoid of tab remnants. In other words, remnants of the third punch-out feature 124 and/or the tabs 134a-c remain attached to the third frame portion 606 and not the peripheral edges 136a-d of the fourth UICC 116.

Figure 8:
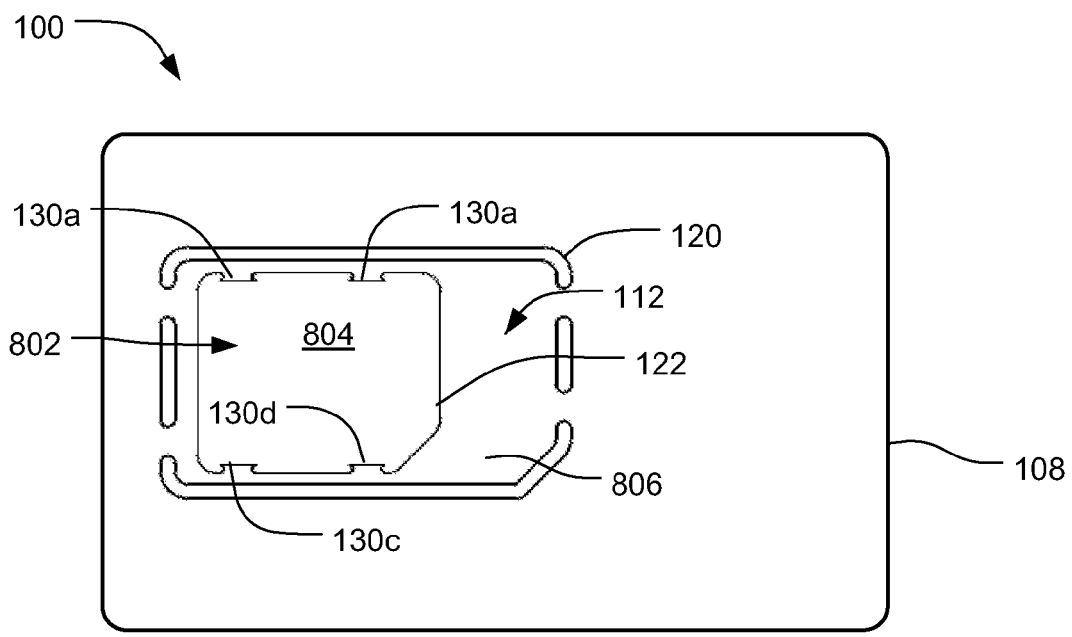
FIG. 8 illustrates the example UICC apparatus of FIG. 1 having the second portion of FIG. 5 and the third portion of FIG. 7 removed.

FIG. 8 illustrates the UICC apparatus 100 of FIG. 1 with a portion 802 of the carrier 102 removed. As shown, a void 804 is formed in the first surface 108 representative of the removed portion 802. In the illustrated example of FIG. 8, the third UICC 114 represents the removed portion 802. In particular, the third UICC 114 is removed from the carrier 102 along the third perimeter defined by the second punch-out feature 122. Additionally, as shown, the second punch-out feature 122 remains attached to the carrier 102 or the second UICC 112 when the third UICC 114 is removed as shown.

Figure 9:
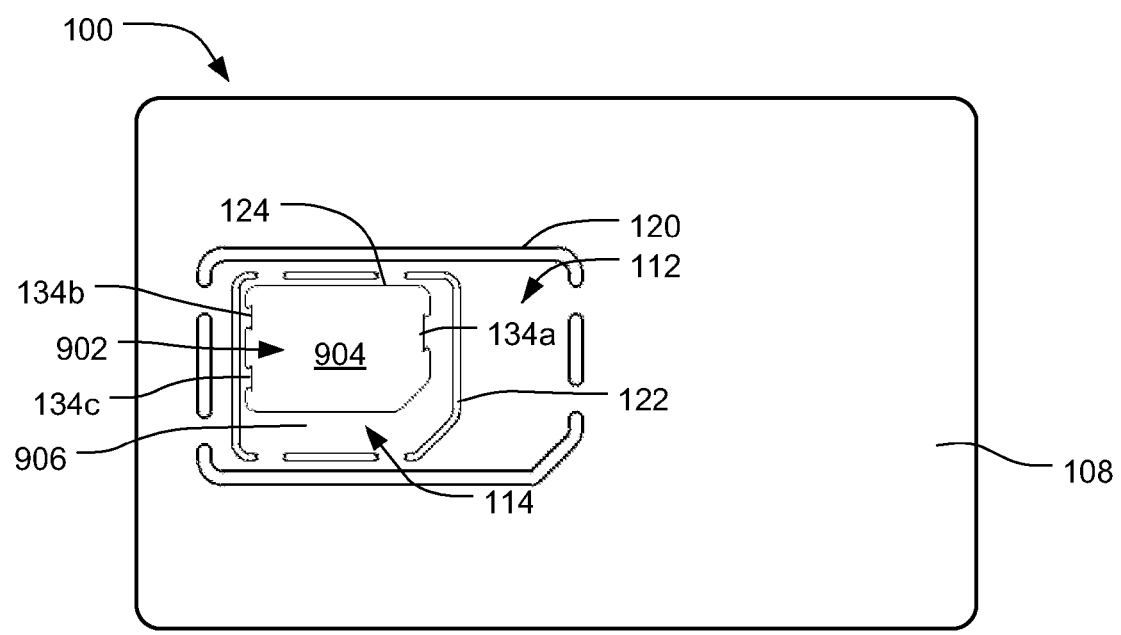
FIG. 9 illustrates the example UICC apparatus of FIG. 1 having the third portion of FIG. 7 removed.

FIG. 9 illustrates the UICC apparatus 100 of FIG. 1 with a portion 902 of the carrier 102 removed. As shown, a void 904 is formed in the first surface 108 representative of the removed portion 902. In the illustrated example of FIG. 9, the fourth UICC 116 represents the removed portion 902. In particular, the fourth UICC 116 is removed from the carrier 102 along the fourth perimeter defined by the third punch-out feature 124. Additionally, as shown, the third punch-out feature 124 remains attached to the carrier 102 or the third UICC 114 when the fourth UICC 116 is removed as shown.

Although the UICC apparatus of FIGS. 1-9 include punch-out features to define the UICC's, the UICC apparatus may be configured with fewer or more punch-out features than shown. For example, the first punch-out feature and, thus, the second UICC 112 may be omitted from the UICC apparatus 100. Alternatively, the carrier 120 may be omitted. Alternatively, the second UICC 112 may define the carrier 102. Further, one or more of the punch-out features may be implemented by a perforated pattern, a modular snap-fit feature, a solid seal overlay, a combination thereof and/or any other suitable punch-out feature(s) or cutout pattern(s).

FIG. 10 is a cross-sectional view of a portion 1000 of the UICC apparatus 100 of FIGS. 1-9. In particular, FIG. 10 illustrates the third punch-out feature 124. Although not shown, the first and second punch-out features 120 and 122 are formed substantially similar to the third punch-out feature 124 and are not further discussed.

In the illustrated example, the third punch-out feature 124 is disposed between the fourth UICC 116 and third UICC 114. As described above, the punch-out feature 124 may be implemented by one or more tabs such as, for example, the tab 134a of FIG. 1. In particular, the third punch-out feature 124 of the illustrated example is formed between the first surface 108 and a second surface 1002 of the carrier 102 opposite the first surface 108. In particular, the tab 134a is formed by a void 1004. In the illustrated example, the void 1004 may be formed by removing material (e.g., via machining) from the second surface 1002 of the carrier 102 and toward the first surface 108 until the tab 134a is provided. In other words, a thickness of the tab 134a is substantially less than a thickness of the carrier 102 defined by the first and second surfaces 108 and 1002.

In the illustrated example, the tab 134a is disposed or formed between a lateral side or outer surface 1006 of the fourth UICC 116 (e.g., a smaller sized UICC) and an inner surface 1008 of the third UICC 114 (e.g., a larger sized UICC). Thus, in general, a punch-out feature may be a tab formed by a recessed cavity or void between an outer surface of a smaller sized UICC and an inner surface of a larger sized UICC.

To facilitate removal of the fourth UICC 116 relative to the third UICC 114 and to ensure that the punch-out feature 124 or the tab 134a (e.g., remnants of the tab 134a) remains attached to the third UICC 114 after the fourth UICC 116 is removed therefrom, the tab 134a of the illustrated example includes a notch or groove 1010. In particular, the notch or groove 1010 in the illustrated example is formed adjacent the outer surface 1006 of the fourth UICC 116 (e.g., the smaller UICC).

Further, the notch or groove 1010 projects from a first surface or side 1012 of the tab 134a and toward the first surface 108. In this example, the notch or groove 1010 includes a tapered profile or cross-sectional shape. In other words, a cross-sectional area of the tab 134a adjacent the outer surface 1006 of the fourth UICC 116 is substantially less than a cross-sectional area of the tab 134a adjacent the inner surface 1008 of the third UICC 114. The notch or groove 1010 provides a line of weakness (e.g., surrounding the entire perimeter of the fourth UICC 116 or a partial perimeter of the UICC 116) to ensure burr or tab remnants remain substantially entirely attached on a frame (e.g., the frame 606 of FIG. 6) of a punched out cavity (e.g., the void 604) and/or the third UICC 114 when the fourth UICC 116 is removed from the third UICC 114. In other words, a structural weakness provided by the notch or groove 1010 ensures the peripheral edges 136a-d of the removed fourth UICC 116 to be relatively smooth and substantially devoid of tab remnants. Further, as noted above, the notch or groove 1010 helps ensure that a removed UICC (e.g., the fourth UICC 116 in the illustrated example) substantially conforms to specific dimensions and/or standards by providing the relatively smooth edges 136a-d.

Additionally or alternatively, the example punch-out feature 124 or the tab 134a of the illustrated example defines a face, surface or side 1016 that is substantially flush with the first surface 108 of the carrier 102 and/or the UICC common surface 118. In this manner, a punch-out feature representative of a smaller UICC (e.g., the fourth UICC 116 of the illustrated example) formed in the carrier 102 does not interfere with an input device or card reader when a larger UICC (e.g., the third UICC 114 of the illustrated example) is used with an input device.

Figure 11:
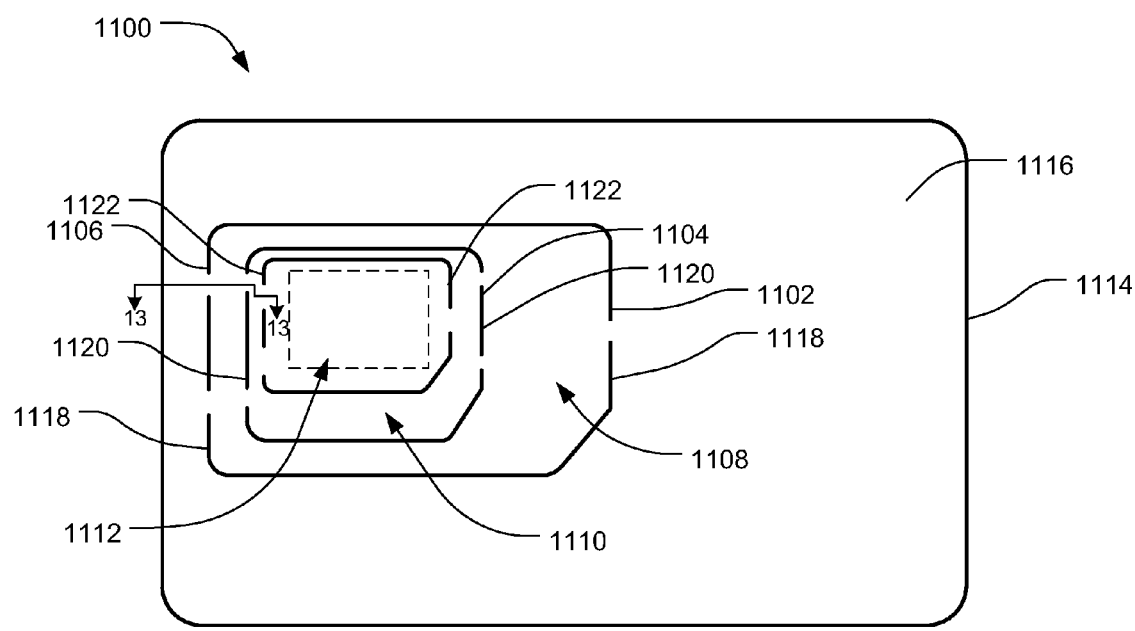
FIG. 11 illustrates another example UICC apparatus illustrating an example pattern of a punch-out feature disclosed herein.

FIG. 11 illustrates another UICC apparatus 1100 described herein having first, second and third punch-out features 1102, 1104 and 1106 that define respective UICCs 1108, 1110 and 1112. A carrier 1114 can also define a fourth UICC 1116. Unlike the alternating orientation of the punch-out features 120, 122 and 124 of the UICC apparatus 100 of FIGS. 1-9, the orientation of the punch-out features 1102, 1104 and 1106 are disposed on parallel edges of the respective UICCs 1108, 1110 and 1112. As shown in FIG. 11, the punch-out features 1102, 1104 and 1106 are disposed along respective ends 1118, 1120 and 1122 of the UICCs 1108, 1110 and 1112.

Figure 12:
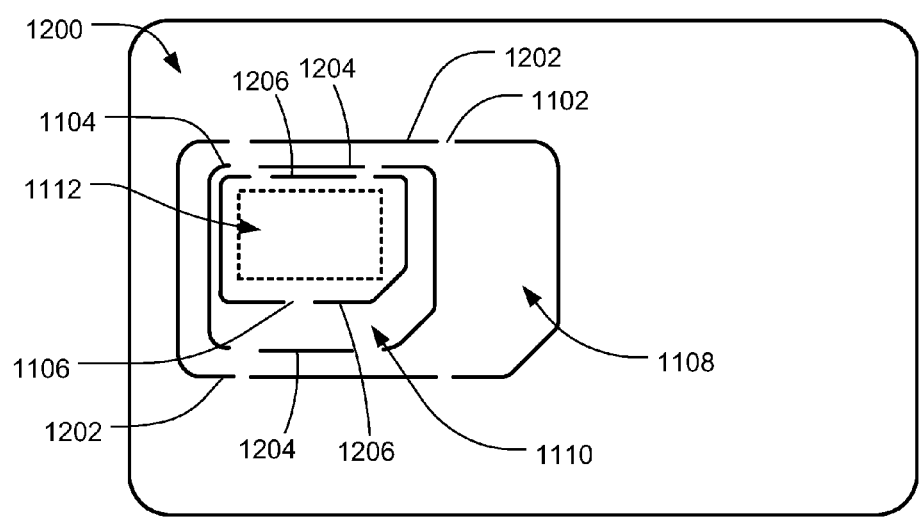
FIG. 12 illustrates another example UICC apparatus illustrating another example pattern of a punch-out feature disclosed herein.

Alternatively, as shown in the example UICC apparatus 1200 of FIG. 12, the punch-out features 1102, 1104 and 1106 may be disposed along respective sides 1202, 1204 and 1206 of the UICCs 1108, 1110 and 1112. Disposing all the punch-out features 1102, 1104 and 1106 on parallel edges 1114, 1116, 1118 or 1202, 1204, 1206 of the respective UICCs 1102, 1104 and 1106 may facilitate alignment of the equipment that produces or forms the punch-out features 1102, 1104 and 1106 in the UICC apparatus 1100 or 1200.

FIG. 13 is a cross-sectional view taken along line 13-13 of FIG. 11 illustrating the UICC apparatus 1100 relative to an input device or card reader 1302. For example, the punch-out features 1102, 1104 and 1106 define respective faces 1304, 1306 and 1308 that are substantially flush relative to each other. In addition, the faces 1304, 1306 and 1308 are substantially flush with a first surface 1310 and/or a UICC common surface 1312 (e.g., having an electrical contact) of the UICC apparatus 1100 to provide a relatively smooth first surface 1310. As a result, the punch-out features 1102, 1104 and 1106 do not interfere, catch and/or damage an electrical contact 1314 of the input device 1302 when the UICC apparatus 1100 is inserted with or removed from the input device 1302. In other words, the flush punch-out features 1102, 1104 and 1106 and/or the flush faces 1304, 1306 and 1308 slide over, across and/or past the electrical contact 1314 of the input device 1302 without interference. The punch-out features 120, 122 and 124 of the example UICC apparatus 100 of FIGS. 1-9 may also be flush relative to the common surface 118 and/or the first surface 108.

FIG. 14A illustrates another example device smart card or UICC apparatus 1400 described herein. FIG. 14B is a cross-sectional view of the example UICC apparatus 1400 taken along line 14B-14B of FIG. 14A.

Similar to the UICC apparatus 100 of FIGS. 1-9, the example UICC apparatus 1400 includes a carrier 1402 that may be configured to define a first UICC 1404, a second UICC 1406, a third UICC 1408 and a fourth UICC 1410. The example UICC apparatus 1400 employs punch-out features 1412, 1414 and 1416 to define the respective second, third and fourth UICCs 1406, 1408 and 1410. In contrast to the plurality of tabs described above in connection with the UICC apparatus 100 in FIGS. 1-9, the example punch-out features 1412, 1414 and 1416 of the illustrated example employ respective perforated patterns or profiles 1412a-d, 1414a-d and 1416a-d. For example, the first perforated pattern or profile 1412a-d defines the first punch-out feature 1412, the second perforated pattern or profile 1414a-d defines the second punch-out feature 1414, and the third perforated pattern or profile 1416a-d defines the third punch-out feature 1416.

In the illustrated example, the first perforated pattern 1412a-d may be formed in the carrier 1402 to define respective edges 1418a-d of the second UICC 1406. The second perforated patterns 1414a-d may be formed in the carrier 1402 to define respective edges 1420a-d of the third UICC 1408. Likewise, the third perforated pattern 1416a-d may be formed in the carrier 1402 to define respective edges 1422a-d of the fourth UICC 1410.

Additionally or alternatively, in the illustrated example, a plurality of voids 1424 may be formed in the carrier 1402 about corner edges of the UICCs 1406, 1408 and 1410. For example, the perforated patterns or profiles 1412a, 1414a and/or 1416a may continuously extend between voids 1424 formed adjacent respective ends of the peripheral edges 1418a, 1420a and 1422a to form respective elongated tabs 1426.

Referring to FIG. 14B, the perforated patterns 1412a-d, 1414a-d and/or 1416a-d may be formed via stamping instead of, for example, milling to provide relatively smaller gaps or voids 1428 adjacent a first or common surface 1430 of the carrier 1402 than gaps or voids 1432 formed adjacent a second surface 1434 opposite the common surface 1430. In this manner, the gaps or voids 1428 of the perforated patterns 1412a-d, 1414a-d and 1416a-d adjacent the common surface 1430 of the carrier 1402 lack any appreciable gap and/or size and provide relatively smooth surface to enable relatively smooth movement relative to an electrical contact of an input device or card reader. Further, the relatively larger gaps or voids 1432 facilitate removal of the respective UICCs 1406, 1408 and 1410 from the UICC apparatus 1400.

Although the UICC apparatus 1400 of FIGS. 14A and 14B include punch-out features 1412, 1414 and 1416 to define the UICC's 1406, 1408 and 1410, the UICC apparatus 1400 may be configured with fewer or more punch-out features than illustratively shown in FIGS. 14A and 14B. For example, the first punch-out feature 1412 and, thus, the second UICC 1406 may be omitted from the UICC apparatus 1400. Alternatively, the carrier 1402 may be omitted. In such an example, the second UICC 1406 may be the carrier 1402. Further, one or more of the punch-out features 1412, 1414 and/or 1416 may implement a tab, a modular snap-fit feature, a solid seal overlay, a combination thereof and/or any other suitable punch-out feature(s) or cutout pattern(s).

Figure 15:
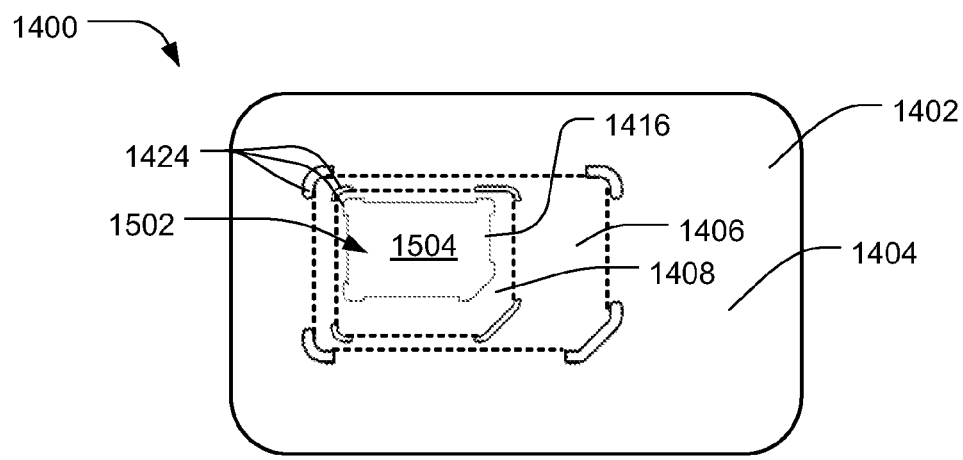
FIG. 15 illustrates the example UICC apparatus of FIG. 14A having a first portion removed.

FIG. 15 illustrates the example UICC apparatus 1400 of FIG. 14A having a portion removed 1502. In the illustrated example, a void 1504 of the removed portion 1502 represents the fourth UICC 1410 of FIGS. 14A and 14B. In particular, the fourth UICC 1410 is removed from the carrier 1402 along the fourth perimeter defined by the third punch-out feature 1416 and the voids 1424. Additionally, as shown, the third punch-out feature 1416 remains attached to the carrier 1402 or the third UICC 1408 when the fourth UICC 1410 is removed, thereby providing the fourth UICC 1410 with relatively smooth edges 1422a-d.

Figure 16:
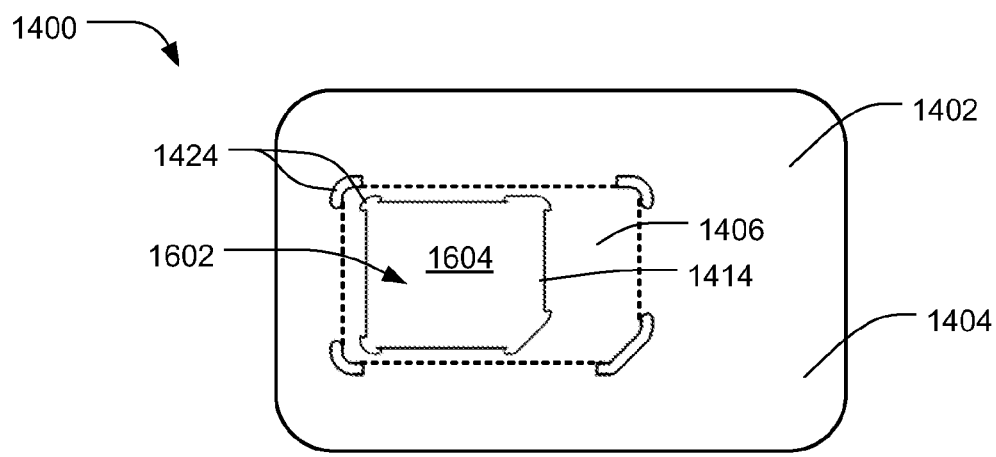
FIG. 16 illustrates the example UICC apparatus of FIG. 14A having a second portion removed.

FIG. 16 illustrates the example UICC apparatus 1400 of FIG. 14A having a portion removed 1602. In the illustrated example, a void 1604 of the removed portion 1602 represents the third UICC 1408 of FIGS. 14A and 14B. In particular, the third UICC 1408 is removed from the carrier 1402 along the third perimeter defined by the second punch-out feature 1414 and the voids 1424. Additionally, as shown, the second punch-out feature 1414 remains attached to the carrier 1402 or the second UICC 1406 when the third UICC 1408 is removed, thereby providing the third UICC 1408 with relatively smooth edges 1420a-d.

Figure 17:
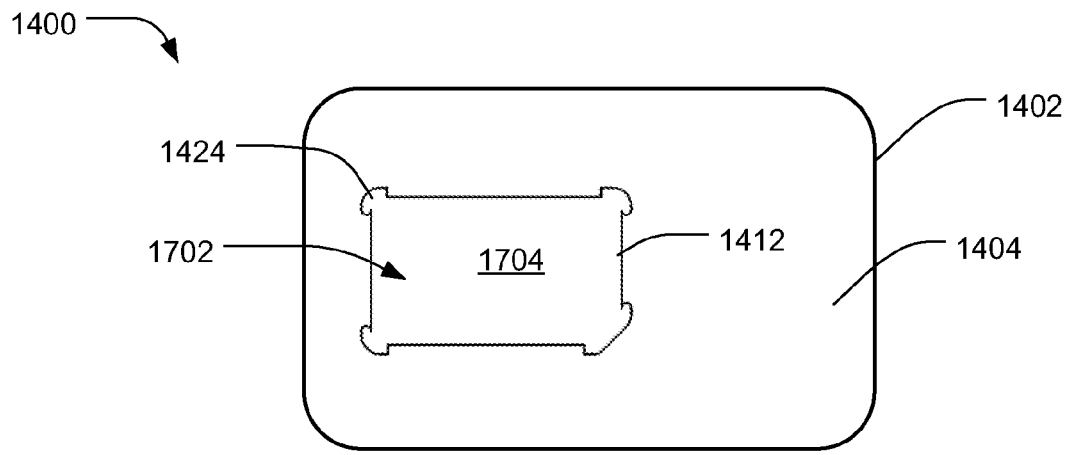
FIG. 17 illustrates the example UICC apparatus of FIG. 14A having a third portion removed.

FIG. 17 illustrates the example UICC apparatus 1400 of FIG. 14A having a portion removed 1702. In the illustrated example, a void 1704 of the removed portion 1702 represents the second UICC 1406 of FIGS. 14A and 14B. In particular, the second UICC 1406 is removed from the carrier 1402 along the second perimeter defined by the first punch-out feature 1412 and the voids 1424. Additionally, as shown, the first punch-out feature 1412 remains attached to the carrier 1402 when the second UICC 1406 is removed, thereby providing the second UICC 1406 with relatively smooth edges 1422a-d.

Figure 18A:
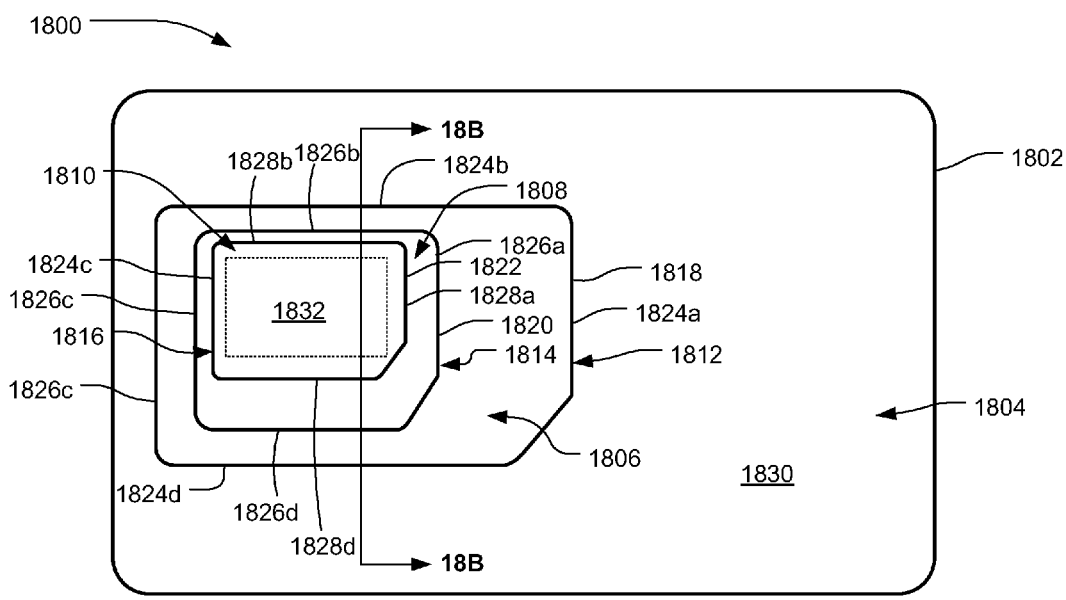
FIG. 18A illustrates another example UICC apparatus having another example punch-out feature disclosed herein.
Figure 18B:
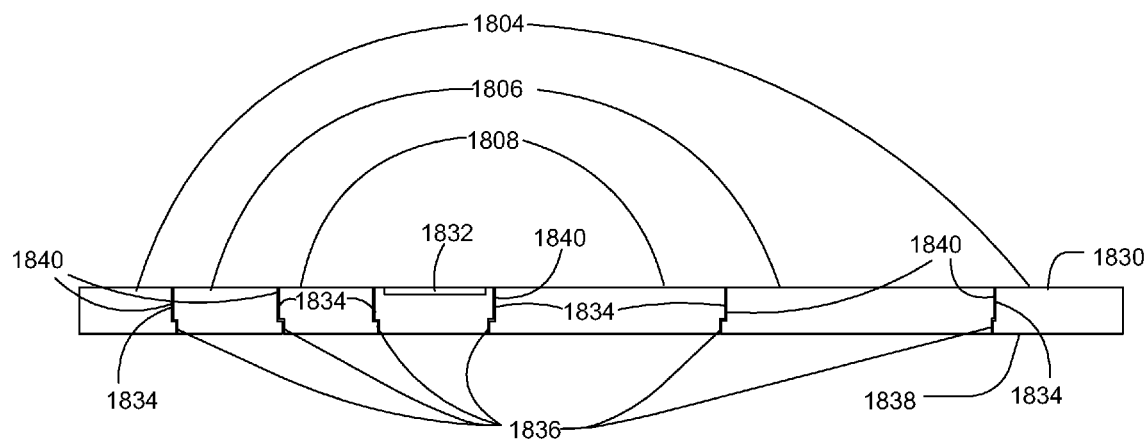
FIG. 18B is a cross-sectional shape of the example UICC apparatus taken along line 18B-18B of FIG. 18A.

FIG. 18A illustrates another example device smart card or UICC apparatus 1800 described herein. FIG. 18B is a cross-sectional view of the example UICC apparatus 1800 taken along line 18B-18B of FIG. 18A.

Similar to the UICC apparatus 100 of FIGS. 1-9, the example UICC apparatus 1800 includes a carrier 1802 that may be configured to define a first UICC 1804, a second UICC 1806, a third UICC 1808 and a fourth UICC 1810. In particular, the example UICC apparatus 1800 employs punch-out features 1812, 1814 and 1816 to define the respective second, third and fourth UICCs 1806, 1808 and 1810. In contrast to the plurality of tabs described above in connection with FIGS. 1-9, the example punch-out features 1812, 1814 and 1816 of the illustrated example employ a plurality of solid seal punch-out overlays. For example, a first solid seal overlay pattern or profile 1818 defines the first punch-out feature 1812, a second solid seal overlay pattern or profile 1820 defines the second punch-out feature 1814 and a third solid seal overlay pattern or profile 1822 defines the third punch-out feature 1816.

In the illustrated example, the first solid seal overlay pattern 1818 defines a first perimeter defining the peripheral edges 1824a-d of the second UICC 1806. Similarly, the second solid seal overlay pattern 1820 defines a second perimeter defining the peripheral edges 1826a-d of the third UICC 1808. Likewise, the third solid seal overlay pattern 1822 defines a third perimeter defining the peripheral edges 1828a-d of the fourth UICC 1810.

Referring to FIG. 18B, the solid seal overlay patterns 1818, 1820 and 1822 of the illustrated example are formed substantially flush relative to a first surface 1830 of the carrier 1802. For example, a portion of each of the solid seal overlay patterns 1818, 1820 and 1822 adjacent the first surface 1830 is substantially sealed, joined or integral the first surface 1830 to provide a substantially smooth surface adjacent a common surface 1832 of the UICCs 1804, 1806, 1808 and 1810. As a result, the solid seal overlay patterns 1818, 1820 and 1822 can pass over electrical contacts of an input device without interfering and/or damaging the electrical contacts.

In particular, the solid seal overlay patterns 1818, 1820 and 1822 of the illustrated example employ planner perforations 1834. Additionally or alternatively, to ensure proper removal the UICCs 1806, 1808 and 1810 relative to the carrier 1802, the planner perforations 1834 of the illustrated example may define a shoulder portion 1836. When a UICC such as, for example, the second UICC 1806 is removed from the carrier 1802, the removed second UICC 1806 has a relatively larger area (e.g., due to the shoulder) than a void in the removed frame portion of the carrier 1402. In the illustrated example, the void or shoulder 1836 is adjacent a second side 1838 of the carrier 1402 opposite the first surface 1830 or electrical contacts or the UICC common surface 1832. Further, the shoulders 1836 are formed adjacent an inner surface 1840 of each of the UICCs 1804, 1806 and 1808. In this manner, when the UICCs 1806, 1808 or 1810 are removed from the UICC apparatus 1800, the shoulder 1836 remains attached to the UICC apparatus 1800 and not an outer surface or edge (e.g., the edges 1824a-d, 1826a-d or 1828a-d) of the UICCs 1806, 1808 and 1810.

Although the UICC apparatus of FIGS. 18A and 18B include punch-out features to define the UICC's, the UICC apparatus 1800 may be configured with less than or more punch-out features 1812, 1814 and/or 1816 than illustratively shown. For example, the first punch-out feature 1812 and, thus, the second UICC 1806 may be omitted from the UICC apparatus 1800. Alternatively, the carrier 1802 may be omitted. Instead, the second UICC 1806 may be the carrier 1802. Further, one or more of the punch-out features 1812, 1814 and/or 1816 may be a tab, a modular snap-fit feature, a perforation, a combination thereof and/or any other suitable punch-out feature(s) or cutout pattern(s).

FIG. 19A illustrates another example device smart card or UICC apparatus 1900 described herein. FIG. 19B is a cross-sectional view of the example UICC apparatus 1900 taken along line 19A-19A of FIG. 19A.

Unlike the UICC apparatus 100 and 1400 described above and/or known UICC apparatus, the UICC apparatus 1900 employs a plurality of separate cards 1902 that can be assembled and/or disassembled via a modular punch-out feature. For example, in contrast to known UICC carriers, the example modular UICC apparatus 1900 enables a smaller sized UICC to be rejoined or reattached to a larger sized UICC with a relatively tight-fit connection.

Turning in detail to FIG. 19A, the UICC apparatus 1900 of the illustrated example includes the plurality of cards 1902 that can be coupled together to define a carrier 1904 having a first side or surface 1906 and a second side or surface 1908 opposite the first surface 1906.

Each of the cards 1902, for example, may be dimensioned to conform to certain UICC form factor standards or dimensions. For example, a first card 1910 may have a perimeter that conforms to a first UICC form factor standard such as, for example, a ID-1 card standard provided by ISO/IEC 7816-1 and 7816-2 (e.g., credit card sized UICC). A second card 1912 may have a second perimeter that conforms to a second UICC form factor standard such as, for example, a plug-in UICC. A third card 1914 may have a perimeter that conforms to a third UICC form factor standard such as, for example, a mini-UICC. The fourth card 1916 may have a perimeter that conforms to a fourth UICC standard or dimension. In other words, the first card 1910 has a perimeter that is greater than the perimeter of the second card 1912, the second card 1912 has a perimeter that is greater than the third card 1914, and the third card 1914 has a perimeter that is greater than the fourth card 1916. Also, the fourth UICC card 1916 of the illustrated example defines a common UICC surface 1918 having one or more electrical contacts.

In the illustrated example, the cards 1910, 1912, 1914 and 1916 can be assembled to define a first UICC 1920. The cards

1912, 1914 and 1916 are assembled to define a second UICC 1922. In other words, the first card 1910 may be removed to define the second UICC 1922. Likewise, the cards 1912 and 1916 are assembled to define a third UICC 1924. To define the third UICC 1924, for example, the first and second cards 1910 and 1912 are decoupled detached from the third card 1914. Further, in this example, the fourth card 1916 may be removed to define a fourth UICC 1926. To define the fourth UICC 1926, for example, the first, second and third cards 1910, 1912 and 1914 are decoupled or detached from the fourth card 1916.

To removably couple the cards 1910-1916, each of the cards 1910-1916 employs a modular punch-out feature. In particular, a first punch-out feature 1928 defines the first perimeter conforming or defining peripheral edges 1930a-d of the second UICC 1922. Similarly, a second punch-out feature 1932 defines the second perimeter conforming or defining peripheral edges 1934a-d (FIG. 1) of the third UICC 1924. Likewise, a third punch-out feature 1936 defines the third perimeter conforming or defining peripheral edges 1938a-d of the fourth UICC 1926. As noted above, the perimeter of the first card 1910 may conform or define peripheral edges 140 of the first UICC 1920.

As most clearly shown in FIG. 19B, the punch-out features 1928, 1932 and 1936 are formed in the second surface 1908 of the carrier 1904 opposite the common surface 1918. In this manner, the punch-out features 1928, 1932 and 1936 enable respective surfaces of the UICCs 1922, 1924 and 1926 defining the first surface 1906 to be relatively flush or smooth. In particular, by providing the punch-out features 1928, 1932 and 1936 adjacent the second surface 1908, the punch-out features 1928, 1932 and 1936 do not interfere with and/or damage an electrical contact of an input device or card reader when the respective UICCs 1920, 1922 or 1924 are inserted in an input device.

The example punch-out features 1928, 1932 and 1936 of the illustrated example employ a modular snap-fit feature. For example, a first snap-fit feature or profile 1928a defines the first punch-out feature 1928, a second snap-fit feature or profile 1932a defines the second punch-out feature 1932 and a third snap-fit feature or profile 1936a defines the third punch-out feature 1936.

The snap-fit features 1928a, 1932a and 1936a of the illustrated example may include a receiving portion or area 1942 (e.g., a female connector) and/or an engaging member 1944 (e.g., a male connector). An example receiving portion 1942 of the illustrated example includes a profile or shape that is substantially complementary to a profile or shape of the engaging member 1944 to enable a snap fit connection between the engaging member 1944 and the receiving portion 1942.

In general, the receiving portion 1942 may be formed adjacent an outer surface of a smaller UICC and an engaging portion may be formed adjacent an inner surface of a larger UICC adjacent the outer surface of the smaller UICC. In this manner, an outer surface of a card removed from the UICC apparatus 1900 does not include an engaging member 1944 adjacent an outer peripheral edge (e.g., the edges 1930a-d, 1934a-d and 1938a-d) of the removed card or UICC it defines. In the illustrated example, the receiving portion 1942 is formed adjacent a perimeter defining an outer surface 1946 of each of the cards 1912, 1914 and 1916 and the engaging member 1944 is formed adjacent a perimeter defining an inner surface 1948 of each of the cards 1910, 1914 and 1916.

In some examples, an intermediate card (e.g., sized between the smallest UICC and the largest UICC) of the UICC apparatus 1900 employs both the receiving portion 1942 and the engaging member 1944. In particular, the receiving portion 1942 is formed adjacent the perimeter defining the outer surface 1946 of the intermediate UICC and the engaging member 1944 is formed adjacent the perimeter defining the inner surface 1948 of the intermediate UICC. In other words, any card that is an intermediate card between a smallest sized UICC (e.g., the fourth UICC) and a largest sized UICC (e.g., the first UICC) of the UICC apparatus 1900 includes at least one of the receiving portion 1942 and the engaging member 1944. For example, each of the example cards 1912 and 1914 of the illustrated example employ the receiving portion 1942 and the engaging member 1944.

Further, the largest sized card of the UICC apparatus 1900 employs only the engaging member 1944. For example, the first card 1910 of the illustrated example employs engaging member 1944. In addition, the smallest sized card of the UICC apparatus 1900 employs only the receiving portion 1942. For example, the fourth card 1916 of the illustrated example employs receiving portion 1942 adjacent the perimeter that defines the outer surface 1946 of the fourth card 1916.

As noted above, the respective punch-out features 1928, 1932, 1936 may be formed along the entire perimeter of each outer surface 1946 and/or inner surface 1948 of the cards 1902. However, in other examples, the punch-out features 1928, 1932, 1936 may be formed along only a portion of the perimeter of the outer surface 1946 and/or inner surface 1948 of each of the cards 1902. Alternatively, the engaging member 1944 and/or the receiving portion 1942 may be formed adjacent corners defined by the respective inner and outer surfaces 1948 and 1946 of the cards 1902.

In the illustrated example, a gap or spacing between the respective cards 1910, 1912, 1914 and 1916 is exaggerated for illustration purposes. In some examples, the respective inner surfaces 1948 of the cards 1910, 1912 and 1914 may contact or engage (e.g., may be flush relative to) the respective outer surfaces 1946 of the cards 1912, 1914 and 1916 to significantly reduce or eliminate an appreciable spacing or gap between the cards 1910, 1912, 1914 and 1916 adjacent the first surface 1906 of the UICC apparatus 1900.

An example engaging member 1944 of the illustrated example includes an arm portion 1950 and a lip portion 1952. The arm portion 1950 extends or protrudes from the inner surface 1948 of a larger sized card and toward the outer surface 1946 (e.g., defined by the edges 1930a-d, 1934a-d, 1938a-d) of a smaller sized card (e.g., the cards 1912, 1914 and 1916). The lip portion 1952 extends away from a surface 1954 of the arm portion 1950 and toward the UICC common surface 1940.

An example receiving portion 1942 of the illustrated example includes a groove, recess or channel 1956. The channel 1956 includes a profile or shape to matably receive the lip portion 1952 of the engaging member 1944. For example, an opening formed by the channel 1956 may have a size or diameter that is slightly smaller than a size or diameter of the lip portion 1952 such that the lip portion 1952 engages the channel 1956 with a relatively tight fit. For example, the lip portion 1952 may be configured to deflect a wall of the channel 1956 when the lip portion 1952 is disposed within the channel 1956. In some examples, a peripheral surface of the lip portion 1952 may employ a detent or lip that engages another one of a detent or lip formed in a surface of the channel 1956 to couple the engaging member 1944 and the receiving portion 1942.

Although the UICC apparatus of FIGS. 19A and 19B include punch-out features to define the UICC's, the UICC apparatus 1900 may be configured with less than or more punch-out features or cards than illustratively shown. For example, the third punch-out feature and, thus, the fourth UICC may be omitted from the UICC apparatus. In such an example, the third UICC would define the smallest UICC of the assembly. Alternatively, the carrier may be omitted. Instead, the second UICC may be the carrier.

Figure 20A:
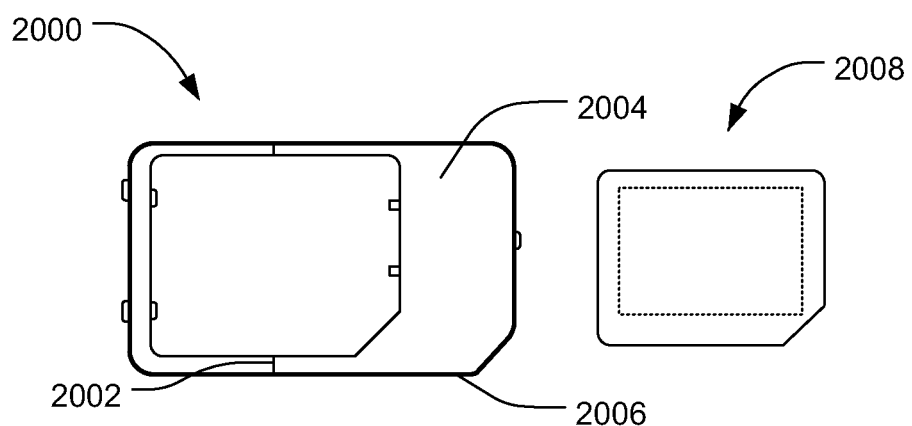
FIG. 20A illustrates another UICC apparatus disclosed herein having a collapsible feature.
Figure 20B:
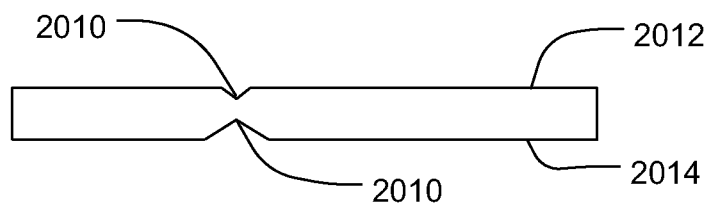
FIG. 20B is a cross-sectional view of the example UICC apparatus of FIG. 20A.

FIG. 20A illustrates an example UICC or carrier 2000 that employs a collapsible feature 2002. FIG. 20B is a cross-sectional view of the example UICC 2000 of FIG. 20A. The UICC 2000 of FIGS. 20A and 20B may define, for example, a body 2004 conforming to an ID-1 card standard, a plug-in UICC and/or a mini-UICC.

The collapsible feature 2002 of the illustrated example enables a frame portion 2006 of the UICC 2000 to collapse when a smaller UICC 2008 (e.g. a mini-UICC) held or attached to the UICC 2000 is removed from the frame portion 2006. For example, the collapsible feature 2002 of the illustrated example employs a score line or a line of weakness 2010 (e.g., a perforation) formed in a surface 2012 and/or a surface 2014 opposite the surface 2012. The collapsible feature 2002 may span substantially across a width of the frame portion 2006. As a result, the collapsible feature 2002 causes the frame portion 2006 to collapse and/or physically separate to prevent nesting of smaller UICC 2008, which was previously removed from the UICC 2000, with the frame portion 2006 for use with an input device that accepts the UICC 2000.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An universal integrated circuit card (UICC) apparatus comprising:
a carrier; and
a first UICC defined by a first punch-out feature formed in the carrier adjacent a first peripheral edge of the first UICC, the first punch-out feature configured to remain attached to the carrier when the first UICC is removed from the carrier, the first punch-out feature including a tab formed by a recessed cavity between the first peripheral edge of the first UICC and an inner edge of the carrier, the tab having a notch adjacent the first peripheral edge of the first UICC to provide a line of weakness adjacent the first peripheral edge of the first UICC to ensure that a remnant of the tab remains substantially entirely attached to the carrier when the first UICC is removed from the carrier, the notch having a tapered profile between the first peripheral edge of the first UICC and an edge of the tab.

2. The UICC apparatus of claim 1, further comprising:
a second UICC defined by a second punch-out feature formed in the carrier and inside a first perimeter of the first punch-out feature, the second punch-out feature configured to remain attached to a first frame portion defined by the first UICC when the second UICC is removed from the carrier; and
a third UICC defined by a third punch-out feature formed in the carrier and inside the first perimeter of the first punch-out feature and a second perimeter of the second punch-out feature, the third punch-out feature configured to remain attached to a second frame portion defined by the second UICC when the third UICC is removed from the carrier.

3. The UICC apparatus of claim 2, wherein the carrier defines a fourth UICC, and wherein the fourth UICC has a dimensional profile greater than the dimensional profiles defined by the first, second and third UICCs.

4. The UICC apparatus of claim 2, wherein the first punch-out feature is formed adjacent the first peripheral edge of the first UICC, the second punch-out feature is formed adjacent a second peripheral edge of the second UICC and the third punch-out feature is formed adjacent a third peripheral edge of the third UICC.

5. The UICC apparatus of claim 1, wherein the tab includes a face substantially flush with a surface defined by the carrier and the first UICC adjacent an electrical contact of the UICC apparatus.

6. The UICC apparatus of claim 5, wherein the first peripheral edge is substantially perpendicular to the face of the tab.

7. An universal integrated circuit card (UICC) apparatus comprising:
a carrier; and
a first UICC defined by a first punch-out feature formed in the carrier, the first punch-out feature configured to remain attached to the carrier when the first UICC is removed from the carrier;
a second UICC defined by a second punch-out feature formed in the carrier and inside a first perimeter of the first punch-out feature, the second punch-out feature configured to remain attached to a first frame portion defined by the first UICC when the second UICC is removed from the carrier;
a third UICC defined by a third punch-out feature formed in the carrier and inside the first perimeter of the first punch-out feature and a second perimeter of the second punch-out feature, the third punch-out feature configured to remain attached to a second frame portion defined by the second UICC when the third UICC is removed from the carrier, wherein the first, second and third punch-out features provide a modular snap-fit feature, wherein the modular snap-fit feature comprises a groove formed in a first surface of the first UICC, the second UICC, or the third UICC, the first surface being opposite a second surface of the respective UICCs or carrier having an electrical contact, and wherein the groove is formed adjacent a perimeter defining an outer surface of the first UICC, the second UICC, or the third UICC; and
an arm protruding along a perimeter defining an inner surface of the carrier, the first UICC or the second UICC and toward the groove of the other one of the first UICC, the second UICC or the third UICC.

8. An universal integrated circuit card (UICC) apparatus comprising:
a carrier having a UICC surface that includes one or more electrical contacts on a face surface opposite a back surface, the UICC surface and a first perimeter of the carrier conforms to a first UICC form factor standard;
a first cutout profile formed in the carrier adjacent the UICC surface such that the UICC surface and the first cutout profile define a second perimeter that conforms to a second UICC form factor standard different than the first UICC when the UICC surface is removed from the carrier along the second perimeter defined by the first cutout profile, the first cutout profile having a first tab formed by a first cavity partially extending from the back surface and toward the face surface, the first tab defining a first portion of the face surface, the first tab having a first notch defining a first line of weakness adjacent an outer lateral edge of the second UICC that is non-parallel relative to the face surface, the first notch having a varying profile between a first end of the first tab and the outer lateral edge of the second UICC;

a second cutout profile formed in the carrier adjacent the UICC surface and the first cutout profile such that the UICC surface and the second cutout profile define a third perimeter that conforms to a third UICC form factor standard different than the first and second UICCs when the UICC surface is removed from the carrier along the third perimeter defined by the second cutout profile, the second cutout profile having a second tab formed by a second cavity partially extending from the back surface and toward the face surface, the second tab defining a second portion of the face surface, the second tab having a second notch defining a second line of weakness adjacent an outer lateral edge of the third UICC that is non-parallel relative to the face surface, the second notch having a varying profile between a first end of the second tab and the outer lateral edge of the third UICC; and a third cutout profile formed in the carrier adjacent the UICC surface, the first cutout profile and the second cutout profile such that the UICC surface and the third cutout profile define a fourth perimeter that conforms to a fourth UICC form factor standard different than the first, second and third UICCs when the UICC surface is removed from the carrier along the fourth perimeter defined by the third cutout profile, the third cutout profile having a third tab formed by a third cavity partially extending from the back surface and toward the face surface, the third tab defining a third portion of the face surface, the third tab having a third notch defining a third line of weakness adjacent an outer lateral edge of the fourth UICC that is non-parallel relative to the face surface, the third notch having a varying profile between a first end of the third tab and the outer lateral edge of the fourth UICC.

9. The UICC apparatus of claim 8, wherein the first UICC has a dimensional profile that is greater than a dimensional profile of the second UICC, the third UICC and the fourth UICC, wherein the second UICC has a dimensional profile that is greater than a dimensional profile of the third UICC and the fourth UICC, and wherein the third UICC has a dimensional profile that is greater than the dimensional profile of the fourth UICC.

10. The UICC apparatus of claim 8, wherein the first cutout profile substantially surrounds the second cutout profile and the third cutout profile, wherein the second cutout profile substantially surrounds the third cutout profile.

11. The UICC apparatus of claim 8, wherein the first cutout profile comprises a first plurality of first tabs, wherein the second cutout profile comprises a second plurality of second tabs, and the third cutout profile comprise a third plurality of third tabs.

12. The UICC apparatus of claim 11, wherein the first, second and third tabs are configured to remain attached with the carrier when one of the respective first, second and third UICCs are removed from the carrier.

13. A method of forming an universal integrated circuit card (UICC) apparatus comprising:

coupling one or more electrical contacts on a first surface of a carrier;

forming a first punch-out feature in the carrier and encompassing the first surface to define a first UICC when the first surface is removed from the carrier along the first punch-out feature;

forming a first tab between an inner lateral surface of the carrier and an outer lateral surface of the first UICC via a recessed cavity formed in a second surface of the carrier opposite the first surface; and forming a notch in the tab with a tapering profile between an end of the tab and the outer lateral surface of the first UICC such that the notch defines a line of weakness to enable a remnant of the tab to remain substantially attached to the carrier when the first UICC is removed from the carrier.

14. The method as defined in claim 13, further comprising:

forming a second punch-out feature in the carrier adjacent to and encompassing the first surface and the first punch-out feature to define a second UICC when the first surface is removed from the carrier along the second punch-out feature; and forming a third punch-out feature in the carrier adjacent to and encompassing the first surface and the first and second punch-out features to define a third UICC when the first surface is removed from the carrier along the third punch-out feature.

15. The method of claim 14, further comprising forming the carrier according to a fourth UICC form factor standard, where the fourth UICC encompasses the first surface and the first, second and third punch-out features.

16. The method of claim 14, further comprising configuring the second punch-out feature to remain attached to the third UICC of the carrier when the second UICC is removed from the carrier along the second punch-out feature.

17. The method of claim 14, further comprising configuring the third punch-out feature to remain attached to the carrier when the third UICC is removed from the carrier along the third punch-out feature.

18. The method of claim 14, forming a plurality of tabs or perforations disposed along a perimeter of at least one of the first punch-out feature, the second punch-out feature and the third punch-out feature.

19. The method of claim 14, further comprising forming a receiving area in a second surface of at least one of the first UICC, the second UICC or the third UICC, the second surface being opposite the first surface, and wherein the receiving area is formed adjacent an outer surface of the first UICC, the second UICC and the third UICC defined by a perimeter of the respective first, second or third punch-out features.

20. A method of forming an universal integrated circuit card (UICC) apparatus comprising:

coupling one or more electrical contacts on a first surface of a carrier;

forming a first punch-out feature in the carrier and encompassing the first surface to define a first UICC when the first surface is removed from the carrier along the first punch-out feature;

forming a second punch-out feature in the carrier adjacent to and encompassing the first surface and the first punch-out feature to define a second UICC when the first surface is removed from the carrier along the second punch-out feature; and forming a third punch-out feature in the carrier adjacent to and encompassing the first surface and the first and second punch-out features to define a third UICC when the first surface is removed from the carrier along the third punch-out feature forming a receiving area in a second surface of at least one of the first UICC, the second UICC or the third UICC, the second surface being opposite the first surface, and wherein the receiving area is formed adjacent an outer surface of the first UICC, the second UICC and the third UICC defined by a perimeter of the respective first, second or third punch-out features; and forming an arm extending from an inner surface defined by the carrier or the first or the second punch-out features, wherein a profile of the receiving area is substantially complementary to a profile of the arm to enable the arm to couple to the receiving area via a snap-fit connection or interference fit.

* * * * *